US010859056B2

(12) United States Patent
Aiello

(10) Patent No.: US 10,859,056 B2
(45) Date of Patent: Dec. 8, 2020

(54) ELECTRONIC CONTROL FOR ENGINE BLOCK HEATER ELEMENTS

(71) Applicant: Bostic Motors Inc., Bostic, NC (US)

(72) Inventor: Jeffrey Graham Aiello, Bostic, NC (US)

(73) Assignee: Bostic Motors Inc., Bostic, NC (US)

( * ) Notice: Subject to any disclaimer, the term of this patent is extended or adjusted under 35 U.S.C. 154(b) by 1010 days.

(21) Appl. No.: 15/297,421

(22) Filed: Oct. 19, 2016

(65) Prior Publication Data

US 2018/0106231 A1   Apr. 19, 2018

(51) Int. Cl.
| | |
|---|---|
| *F02N 19/02* | (2010.01) |
| *F02N 19/04* | (2010.01) |
| *B60L 1/08* | (2006.01) |
| *F02N 11/08* | (2006.01) |

(52) U.S. Cl.
CPC ............ *F02N 19/02* (2013.01); *B60L 1/08* (2013.01); *F02N 19/04* (2013.01); *B60L 2240/425* (2013.01); *F02N 11/0811* (2013.01); *F02N 2200/023* (2013.01)

(58) Field of Classification Search
CPC .. B60L 1/08; B60L 2240/425; F02N 11/0811; F02N 19/02; F02N 19/04; F02N 2200/023; F02N 19/10; H05B 1/0236
USPC ................................. 219/202, 203, 546, 547
See application file for complete search history.

(56) References Cited

U.S. PATENT DOCUMENTS

| | | | |
|---|---|---|---|
| 2,140,499 A | * | 12/1938 | Duvall .................... D06F 75/28 38/42 |
| 3,213,994 A | | 10/1965 | Hohler |
| 3,870,855 A | | 3/1975 | Edlund et al. |
| 4,296,334 A | | 10/1981 | Wong |
| 4,700,888 A | | 10/1987 | Samulak |
| 5,012,070 A | | 4/1991 | Reed |
| 5,280,158 A | | 1/1994 | Matava et al. |
| 5,781,877 A | | 7/1998 | Rachel et al. |
| 5,994,669 A | | 11/1999 | McCall |
| 7,141,766 B2 | | 11/2006 | Jorgensen et al. |
| 7,873,464 B2 | | 1/2011 | Shartzer et al. |
| 8,140,246 B1 | | 3/2012 | Manchanda |
| 8,538,623 B2 | | 9/2013 | Eser et al. |
| 8,620,460 B2 | | 12/2013 | Bergman et al. |

(Continued)

*Primary Examiner* — Dana Ross
*Assistant Examiner* — James F Sims, III
(74) *Attorney, Agent, or Firm* — Jeffrey C. Watson; Mathew L. Grell; Grell & Watson Patent Attorneys LLC

(57) ABSTRACT

An electronic control for engine block heater elements for heating an engine to an engine ready temperature includes a power input, a power output, and a controller. The controller includes a clock for keeping a time and a temperature sensor for sensing a temperature. The controller is configured for controlling the power from the power input to the power output in at least two modes of operation for heating the engine to the engine ready temperature. The second mode of timed ready is where the power from the power input to the power output is connected at a pre-calculated time interval for the purpose of making ready the subject vehicle for starting at the desired start time as set by the user. The third mode of maintain ready is where the power from the electrical outlet to the engine block heater element is regulated to maintain the engine ready temperature.

20 Claims, 22 Drawing Sheets

(56) References Cited

U.S. PATENT DOCUMENTS

| | | | |
|---|---|---|---|
| 2008/0061051 A1* | 3/2008 | Traina | F02N 19/10 |
| | | | 219/205 |
| 2010/0176111 A1 | 7/2010 | Neisen | |
| 2010/0176209 A1 | 7/2010 | Van Cleve | |
| 2012/0055663 A1* | 3/2012 | Onozawa | H05B 1/0236 |
| | | | 165/266 |
| 2015/0159615 A1 | 6/2015 | Van Wiemeersch et al. | |
| 2016/0095968 A1* | 4/2016 | Rudser | A61M 1/1086 |
| | | | 600/17 |

\* cited by examiner

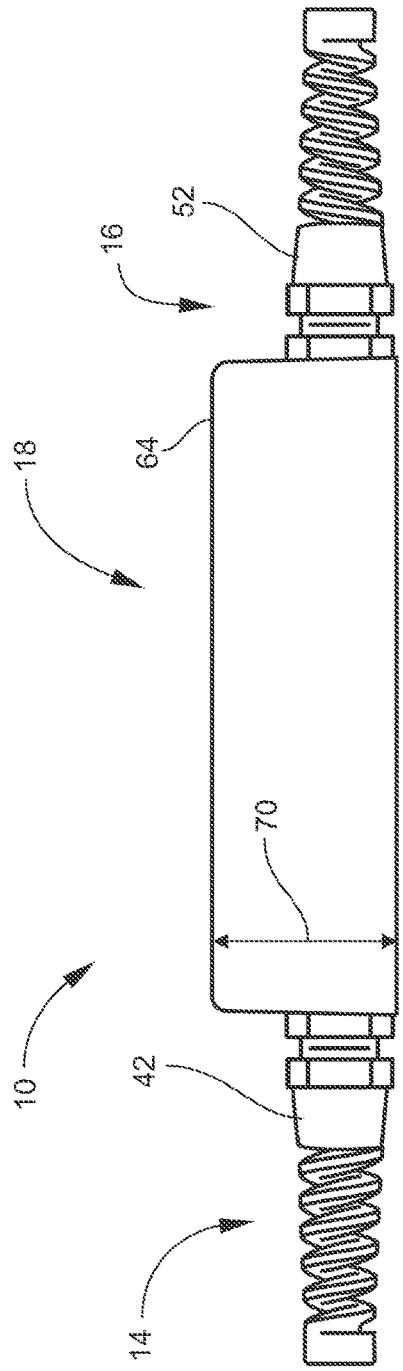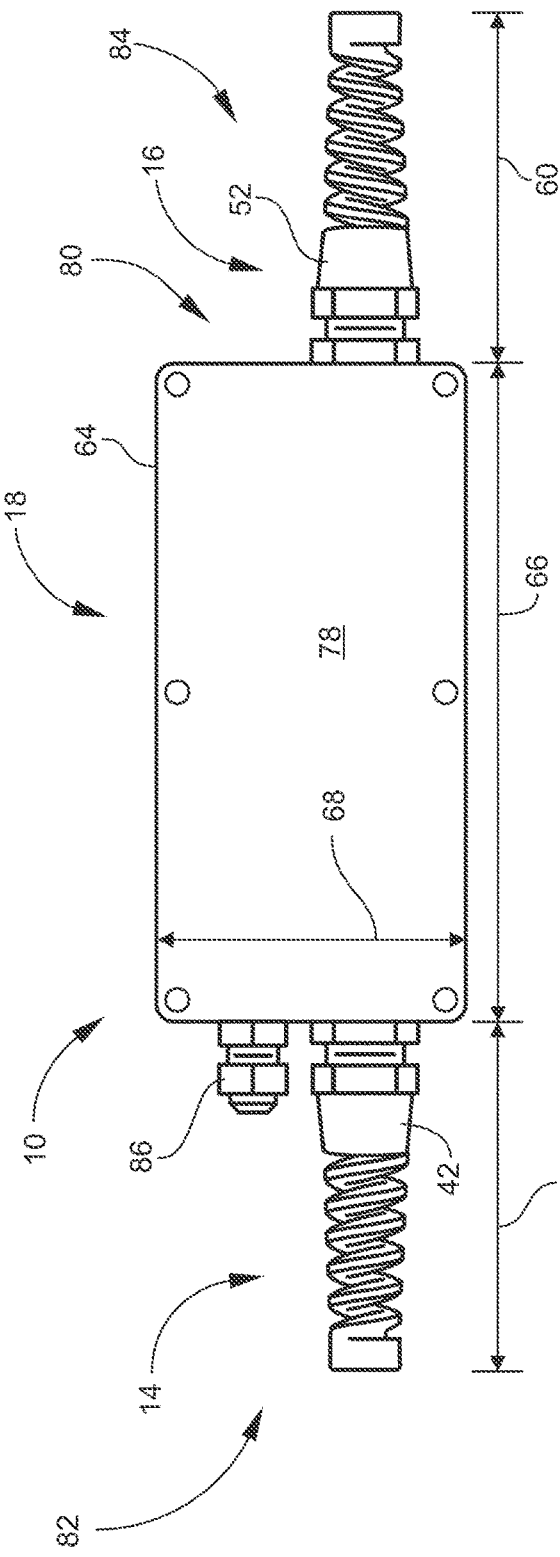

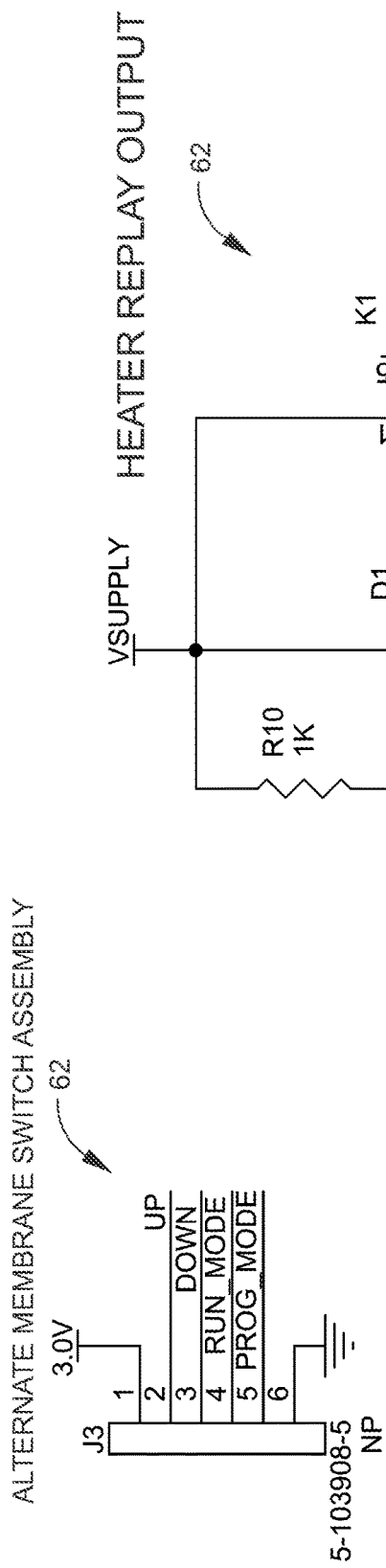
FIG. 7G
FIG. 7H
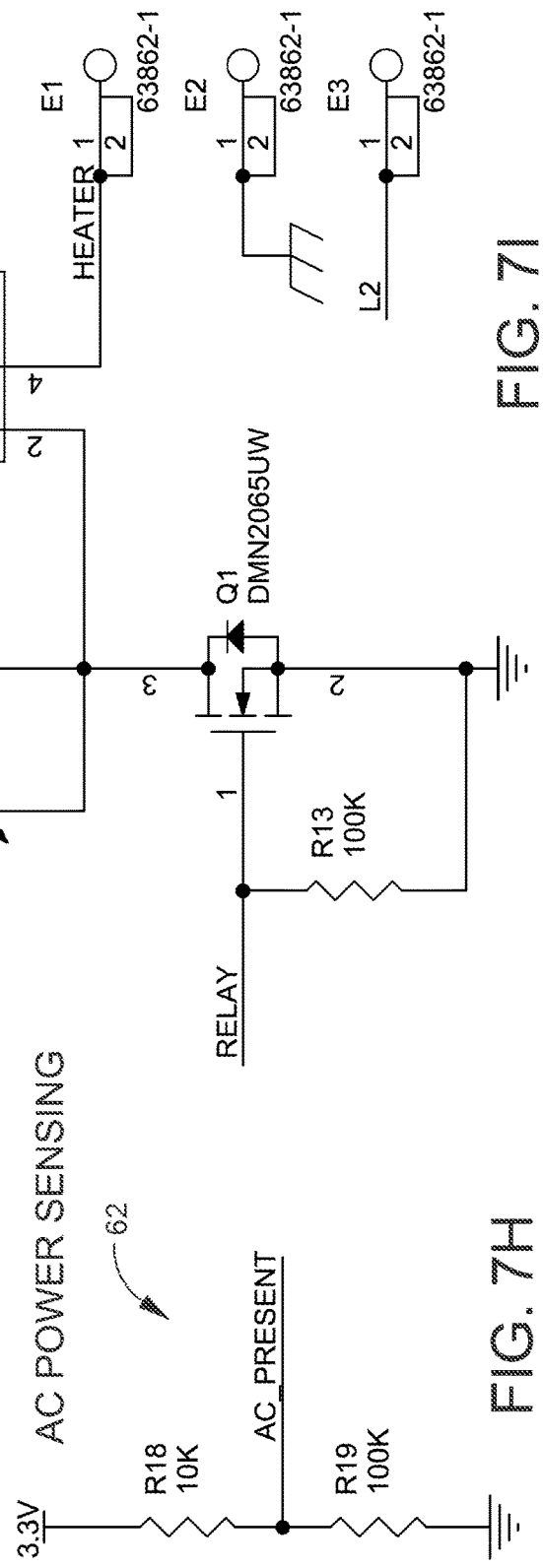
FIG. 7I

ELECTRONIC CONTROL FOR ENGINE BLOCK HEATER ELEMENTS

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to engine block heaters. More particularly, the instant disclosure relates to an electronic control for engine block heater elements.

Description of the Related Art

An engine block heater warms an engine to increase the chances that the engine will start as well as warm up the vehicle faster than it normally would in extremely cold weather. The most common type of engine block heater is an electric heating element in the cylinder block, connected through a power cord often routed through the vehicle's grille. In some embodiments, the engine block heater may replace one of the engine's core plugs. In this fashion, the heater element is immersed in the engine's coolant, which then keeps most of the engine warm. In other forms, engine block heaters may also be installed in line with one of the radiator or heater hoses. Engine block heaters are also available for engine oil for easier starting from warm oil that can immediately circulate throughout the engine during start up. The easier starting results from warmer, less viscous engine oil and less condensation of fuel on cold metal surfaces inside the engine. As such, in theory, an engine block heater may reduce a vehicle's emission of unburned hydrocarbons and carbon monoxide. Another benefit of an engine block heater may be that heat is available more instantly for the passenger compartment and glass defogging.

Current engine block heaters are typically plugged into an outlet located beside the vehicle. As such, the engine block heater element is either on or off depending on if the engine block heater is plugged in or not. As a result, a user either has to remember to plug in the engine block heater a certain time prior to starting and/or using the vehicle, or must keep the engine block heater plugged in and on at all times. This clearly can lead to forgetting to plug in the engine block heater in enough time prior to starting and/or using the vehicle, and/or having the engine block heater powered on for longer periods of time, thereby wasting electricity and adding unneeded costs. As such, there is clearly a need to provide a control to engine block heaters that can turn the engine block heater element on or off at set time intervals.

In addition, current engine block heater elements are either on or off. As such, once powered on, the engine block heater element produces as much heat as it can until it is powered off, regardless of the ambient temperature. As explained above, this powering on or off requires the user to plug in or unplug the engine block heater at various times prior to starting and using the vehicle. This requires the user to guess how much time it will take to warm the engine prior to starting and using the vehicle, based on the ambient temperature, and then plugging in the engine block heater in at least that amount of time prior to starting and using the vehicle. This clearly can lead to forgetting to plug the engine block heater in and/or miscalculations in the amount of time required for the engine block heater to heat the engine prior to starting and/or using the vehicle. As such, there is clearly a need to provide a control to engine block heaters that can regulate the engine block heater element based on the ambient temperature.

The instant disclosure of an electronic control for an engine block heater element is designed to address at least some aspects of the problems discussed above.

SUMMARY

Briefly described, in a possibly preferred embodiment, the present disclosure overcomes the above-mentioned disadvantages and meets the recognized need for such a device by providing an electronic control for an engine block heater element for heating an engine to an engine ready temperature. The electronic control may generally include a power input, a power output, and a controller. The controller may be between the power input and the power output, and may include a clock to keep time and a temperature sensor to sense a temperature. The controller may be configured for controlling the power from the power input to the power output in at least two modes of operation for heating the engine to the engine ready temperature. The second mode of operation of timed ready may be where the power from the power input to the power output is connected at a certain time using a calculation based upon three factors/inputs: the time kept by the clock, the desired ready time, as set by the user, and the ambient temperature, as sensed by the temperature sensor (i.e. thermistor). The third mode of operation of maintain ready may be where the power from the power input to the power output may be regulated to maintain the engine ready temperature based on the temperature sensed by the temperature sensor (i.e. thermistor). In other words, the third mode of operation of maintain ready may be where the power from the power input to the power output is regulated by a calculation based on the temperature sensed by the temperature sensor (i.e. thermistor) to maintain the engine ready temperature. The intention of this third mode of maintain ready may be to constantly and perpetually maintain an engine coolant temperature (via the block heater) adequate enough to provide the user the ability to start the subject engine at any time.

In select embodiments of the electronic control, a first mode of operation of heater off may be included. This first mode of operation of heater off may be where the power from the power input to the power output is disconnected.

In other select embodiments of the electronic control, a fourth mode of operation of heater on may be included. This fourth mode of operation of heater on may be where the power from the power input to the power output is connected or passed through without any manipulation.

One feature of the electronic control may be that the power input may be configured to connect to an electrical outlet, and the power output may be configured to connect to the engine block heater element. This feature may allow the first mode of operation of heater off to be where the power from the electrical outlet to the engine block heater element is disconnected. This feature may also allow the second mode of operation of timed ready to be where the power from the electrical outlet to the engine block heater element may be connected at the calculated time interval for the engine ready temperature using the time kept by the clock and the temperature sensed by the temperature sensor. This feature may also allow the third mode of operation of maintain ready to be where the power from the electrical outlet to the engine block heater element may be regulated to maintain the engine ready temperature based on the temperature sensed by the temperature sensor. This feature may also allow the fourth mode of operation of heater on to be where the power from the electrical outlet to the engine block heater element is connected or passed through without any manipulation.

Another feature of the electronic control may be that the power input can include a pigtail input connector with a five foot #14-3 conductor power cord, that may be rated at 1800 watts, with a male end configured to connect to a standard 120V electrical outlet. In select embodiments, the pigtail input connector may be custom sized to meet the end user's needs.

Another feature of the electronic control may be that the power output can include a pigtail output connector with a five foot #14-3 conductor output cord that can be rated at 1800 watts, with a female end configured to connect to the male end of the engine block heater element. In select embodiments, the pigtail input connector may be custom sized to meet the end user's needs.

In select embodiments of the electronic control, the controller can include a printed circuit board including the clock, the temperature sensor, and a microprocessor for the controller. A housing may be included for the printed circuit board. In select embodiments, the housing may have a length of approximately 7.50 inches, a width of approximately 3.63 inches, and a height of approximately 2.18 inches. A face plate may be on a top side of the housing for providing a user interface for the controller. A cover may be on a bottom side of the housing for sealing the printed circuit board in the housing, thereby making the controller water resistant or sealed from non-pressurized moisture. A pigtail input connector may be on one side of the housing in communication with the power input, and a pigtail output connector may be on the other side of the housing in communication with the power output. A grommet may be in a hole on one side of the housing. The grommet may contain the temperature sensor, whereby the temperature sensor may extend outside the housing, physically protected within the grommet or "cord strainer" for the purpose of accurately measuring outside ambient air temperature. One feature of the user interface on the face plate may be the inclusion of a display configured to show the time, the temperature, or combinations thereof. In select embodiments, the display may be a red 7-segmented LED display with 4 digits.

Another feature of the user interface on the face plate may be the inclusion of a status indicator configured to signal whether the device is in the second mode of operation of timed ready, or the third mode of operation of maintain ready. In select embodiments, the status indicator may include 2 different LED's with corresponding text printed on the face plate of "timed ready", and "maintain ready".

Another feature of the user interface on the face plate may be the inclusion of a power indicator configured to signal when the device is in the fourth mode of operation where the power input is connected to the power output or when the device is in the first mode of operation of heater off. In select embodiments, the power indicator may include an LED with corresponding text printed on the face plate of "heater on".

Another feature of the user interface on the face plate may be the inclusion of an up button configured to adjust units of time or temperature up on the display.

Another feature of the user interface on the face plate may be the inclusion of a down button configured to adjust units of time or temperature down on the display.

Another feature of the user interface on the face plate may be the inclusion of a set button configured for setting the adjusted units of the time, the certain time interval, or the units of temperature.

Another feature of the user interface on the face plate may be the inclusion of a mode button configured for changing the controller between the first mode of operation of heater off, the second mode of operation of timed ready, the third mode of operation of maintain ready, and the fourth mode of operation of heater on.

Another feature of the electronic control may be that the controller can include a battery backup configured to maintain the time kept by the clock for up to 90 days with no power to the power input.

Another feature of the electronic control may be that the temperature sensor may be a thermistor, mounted outside of the housing, like in or through the grommet.

Another feature of the electronic control may be that it can have an operating temperature of between −50° F. and 110° F.

Another feature of the electronic control may be that it can be configured to control a 2400 w load at 120v AC.

In another aspect of the instant disclosure, an engine block heater is contemplated for heating an engine to an engine ready temperature. The engine block heater may generally include a power input, a power output, and a controller. The controller may be between the power input and the power output, and may include a clock for keeping a time and a temperature sensor for sensing a temperature. The controller is configured for controlling the power from the power input to the power output in at least two modes of operation. The second mode of operation of timed ready may be where the power from the power input to the power output is connected at a certain time using a calculation based upon three factors/inputs: the time kept by the clock, the desired ready time, as set by the user, and the ambient temperature, as sensed by the temperature sensor (i.e. thermistor). The third mode of operation of maintain ready may be where the power from the power input to the power output is regulated by a calculation based on the temperature sensed by the temperature sensor (i.e. thermistor) to maintain the engine ready temperature. The intention of this third mode of operation of maintain ready may be to constantly and perpetually maintain an engine coolant temperature (via the block heater) adequate enough to provide the user the ability to start the subject engine at any time.

In select embodiments of the engine block heater, the first mode of operation of heater off may be where the controller disconnects the power output from the power input.

In select embodiments of the engine block heater, the fourth mode of operation of heater on may be where the controller connects the power input to the power output without manipulation, thereby energizing the block heater constantly and without interruption in perpetuity.

One feature of the engine block heater may be that the power input may be configured to connect to an electrical outlet, and the power output may be configured to connect to an engine block heater element. This feature may allow the first mode of operation of heater off to be where the power from the electrical outlet to the engine block heater element may be disconnected. This feature may also allow the second mode of operation of timed ready to be where the power from the electrical outlet to the engine block heater element may be connected at the calculated time interval using the time kept by the clock and the temperature sensed by the temperature sensor (i.e. thermistor). This feature may also allow the third mode of operation of maintain ready to be where the power from the electrical outlet to the engine block heater element may be regulated by a calculation of the controller based on the temperature sensed by the temperature sensor to maintain the engine ready temperature. The intention of this mode may be to constantly and perpetually maintain an engine coolant temperature (via the block heater) adequate enough to provide the user the ability to start the subject engine at any time.

In select embodiments of the engine block heater, the controller can include a printed circuit board including the clock, the temperature sensor, and a microprocessor for the controller. A housing may be included for the printed circuit board. In select embodiments, the housing may have a length of approximately 7.50 inches, a width of approximately 3.63 inches, and a height of approximately 2.18 inches. A face plate may be on a top side of the housing for providing a user interface for the controller. A cover may be on a bottom side of the housing for sealing the printed circuit board in the housing, thereby making the controller water resistant or sealed from non-pressurized moister. A pigtail input connector may be on one side of the housing in communication with the power input, and a pigtail output connector may be on the other side of the housing in communication with the power output. A grommet may be in a hole on one side of the housing and may contain the temperature sensor or allow it to pass through to the outside of the housing. Thus, the temperature sensor may extend outside the housing via the grommet or may be positioned in the grommet. The temperature sensor may be outside the housing, but physically protected within the grommet or "cord strainer" for the purpose of accurately measuring outside ambient air temperature.

One feature of the user interface on the face plate may be the inclusion of a display configured to show the time, the temperature, or combinations thereof. In select embodiments, the display may be a red 7-segmented LED display with 4 digits.

Another feature of the user interface on the face plate may be the inclusion of a status indicator configured to signal whether the device is in the second mode of operation of timed ready, or the third mode of operation of maintain ready. In select embodiments, the status indicator may include 2 different LED's with corresponding text printed on the face plate of "timed ready", and "maintain ready".

Another feature of the user interface on the face plate may be the inclusion of a power indicator configured to signal when the controller is in the fourth mode of operation of heater on where the power input is connected to the power output, or the controller is in the first mode of operation of heater off. In select embodiments, the power indicator may include an LED with corresponding text printed on the face plate of "heater on".

Another feature of the user interface on the face plate may be the inclusion of an up button configured to adjust units of time or temperature up on the display.

Another feature of the user interface on the face plate may be the inclusion of a down button configured to adjust units of time or temperature down on the display.

Another feature of the user interface on the face plate may be the inclusion of a set button configured for setting the adjusted units of the time, the certain time interval, or the units of temperature.

Another feature of the user interface on the face plate may be the inclusion of a mode button configured for changing the controller between the first mode of operation of heater off, the second mode of operation of timed ready, the third mode of operation of maintain ready, and the fourth mode of operation of heater on.

Another feature of the engine block heater may be that the controller can include a battery backup configured to maintain the time kept by the clock for up to 90 days with no power to the power input.

Another feature of the engine block heater may be that the temperature sensor may be a thermistor.

Another feature of the engine block heater may be that it can have an operating temperature of between −50° F. and 110° F.

Another feature of the engine block heater may be that it can be configured to control 2400 w load at 120v AC.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 2 is a schematic bottom side view of the electronic control for engine block heater elements from FIG. 1;

FIG. 3 is a schematic back side view of the electronic control for engine block heater elements from FIG. 1;

FIG. 7A shows an embodiment of the circuit diagram for the microcontroller, the real time clock crystal and the reset RC, FIG. 7G shows an embodiment of the alternate membrane switch inputs circuit, FIG. 7H shows an embodiment of the AC power sensing circuit, FIG. 7I shows an embodiment of the heater replay output circuit, FIG. 7O shows the power supply, 12 VDC unregulated to 3.3V regulated, for the battery backup circuit;

Figure 1:
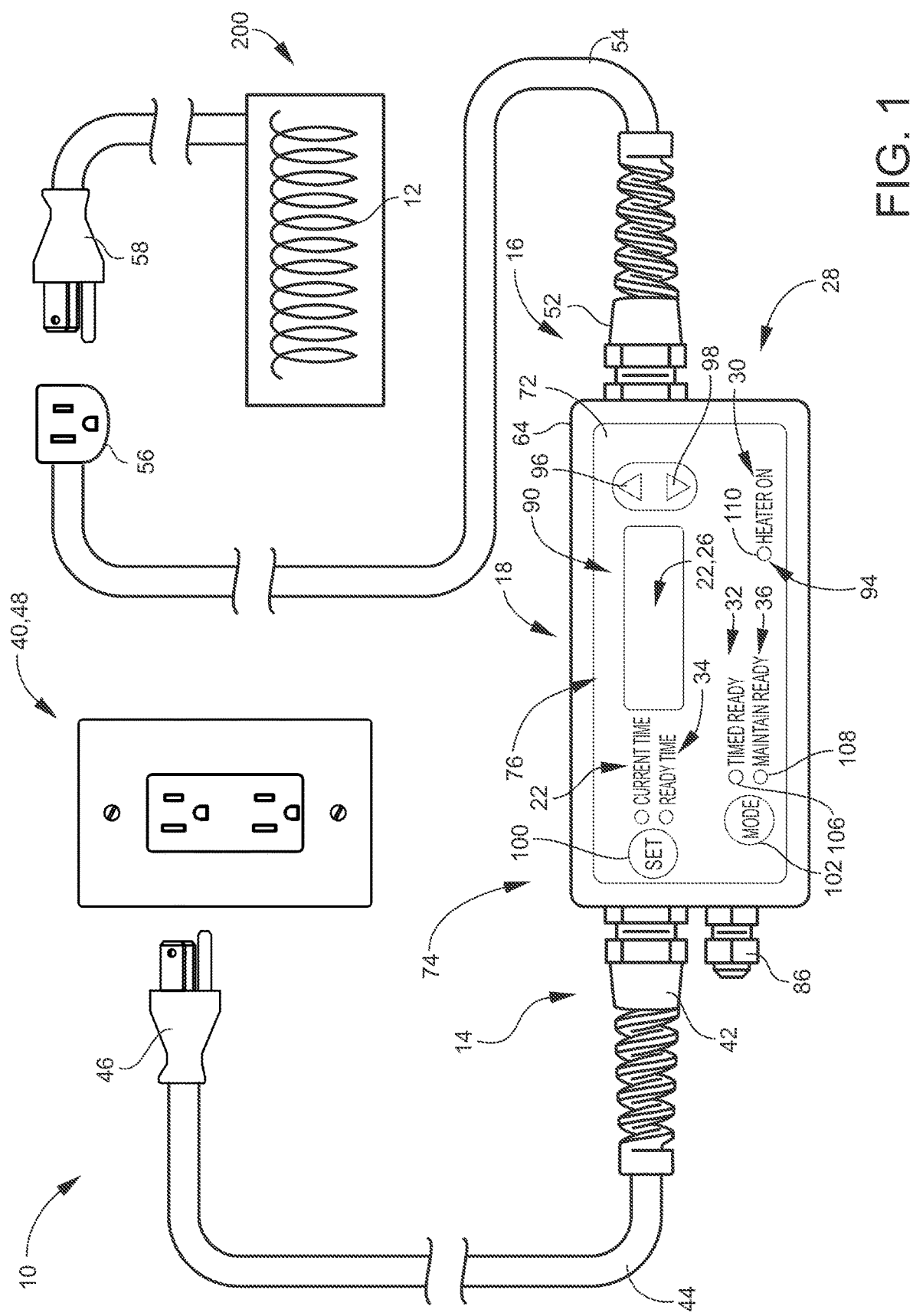
FIG. 1 is a schematic front side view of the electronic control for engine block heater elements according to select embodiments of the instant disclosure with a power input cord with a male end for an electrical outlet and a power output cord with a female end for the male end of an engine block heater.
Figure 4:
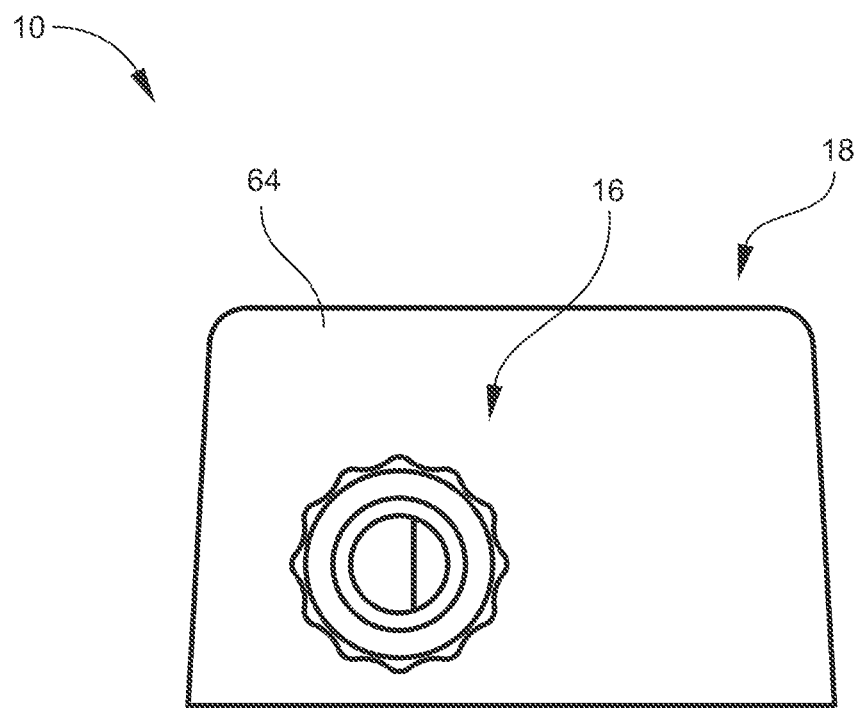
FIG. 4 is a schematic right side view of the electronic control for engine block heater elements from FIG. 1.
Figure 5:
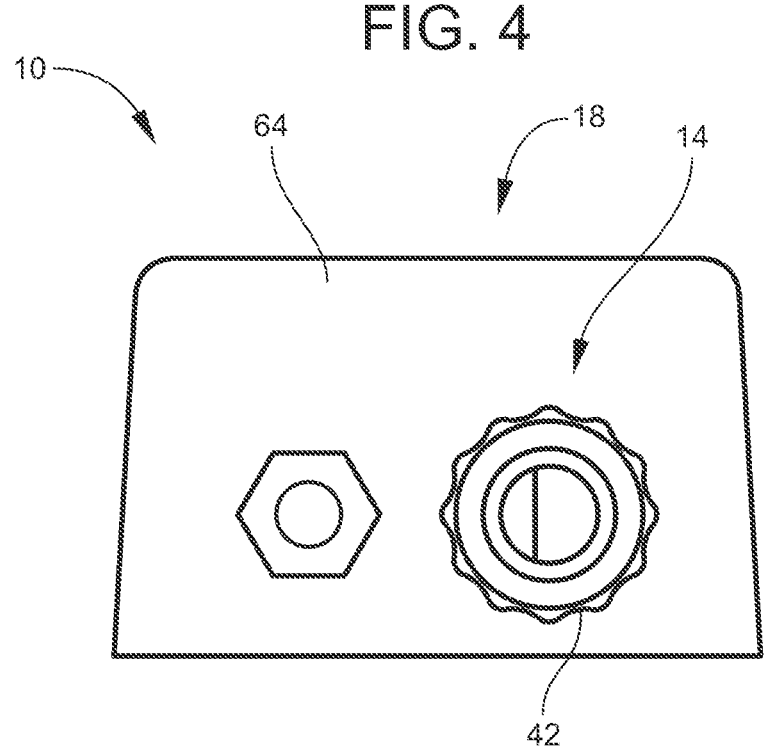
FIG. 5 is a schematic left side view of the electronic control for engine block heater elements from FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-17, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-7 by way of example, and not limitation, therein is illustrated example embodiments of electronic control 10 for engine block heater element 12 of engine block heater 200. Electronic control 10 may be for providing a control to engine block heater 200 that can turn the engine block heater element 12 on or off at calculated time intervals for heating the engine to an engine ready temperature at a desired ready time, and/or to provide a control to engine block heater 200 that can regulate the engine block heater element 12 to constantly maintain the engine ready temperature of the engine based on the ambient temperature. Engine block heater 200 with engine block heater element 12 may be any style or type of engine block heater, whether now known or later developed, with any type or size of engine block heater element. Electronic control 10 may generally include power input 14, power output 16, and controller 18. These parts are described in detail below.

Power input 14 may be included with controller 18 of electronic control 10 for engine block heater element 12. See FIGS. 1-6. Power input 14 may be for connecting power, like from electrical outlet 40, to electronic control 10. Power input 14 may be any device or means for connecting power to electronic control 10. In select embodiments, but clearly not limited thereto, as shown in the figures, power input 14 can include pigtail input connector 42. In select embodiments, the pigtail input connector 42 may have length 50 of approximately 3.925 inches. However, the disclosure is not so limited to pigtail type input connections, and any type of input connection may be made between power input 14 and controller 18. Power input 14 may include any type of cord or cable for connecting power input 14 with electrical outlet 40. For example, power input 14 may include a five foot #14-3 conductor power input cord 44, that may be good for 1800 watts and/or 20 amps. Power input 14 may include with male end 46 configured for connecting to standard 120V electrical outlet 48. Electronic control 10 may be configured to control 2400 w load at 120v AC.

Power output 16 may be included in controller 18 of electronic control 10 for engine block heater element 12. See FIGS. 1-6. Power output 16 may be for outputting power from electronic control 10, like to engine block heater element 12. Power output 16 may be any device or means for outputting power from electronic control 10. In select embodiments, but clearly not limited thereto, as shown in the figures, power output 16 can include pigtail output connector 52. In select embodiments, pigtail output connector 52 may have length 60 of approximately 3.925 inches. However, the disclosure is not so limited to pigtail type output connections, and any type of output connection may be made between power output 16 and controller 18. Power output 16 may include any type of cord or cable for connecting power output 16 with engine block heater element 12. For example, power output 16 may include a five foot #14-3 conductor output cord 54, that can be good for 1800 watts and/or 20 amps. Power output 16 may include female end 56 configured to connect to male end 58 of engine block heater element 12.

Controller 18 may be included in electronic control 10 for engine block heater element 12. See FIGS. 1-6. Controller 18 may be for controlling, regulating, directing, governing, calculating, the like, etc. the power from power input 14 to power output 16. Controller 18 may include any devices, processors, microprocessors, machines, chips, microchips, computers, circuits, the like, etc. for controlling, regulating, directing, governing, calculating the like, etc. the power from power input 14 to power output 16. As such, controller 18 may be positioned in a circuit between power input 14 and power output 16.

Clock 20 may be included in controller 18 of electronic control 10 for engine block heater element 12. See FIGS. 1 and 6. Clock 20 may be for keeping the time 22.

Temperature sensor 24 may be included in controller 18 of electronic control 10 for engine block heater element 12. See FIGS. 1 and 6. Temperature sensor 24 may be for sensing the temperature 26. In select embodiments, temperature sensor 24 may be thermistor 114. Thermistor 114 may be any type of resistor whose resistance is dependent on temperature, whereby the temperature 26 may be sensed by the amount of resistance provided by thermistor 114.

Housing 64 may be included with controller 18 of electronic control 10 for engine block heater element 12. See FIGS. 1-6. Housing 64 may be for housing all of the components of controller 18, including, but not limited to, all of the components of printed circuit board 62. Housing 64 may be any desired shape and/or size. Housing 64 may include a substantially rectangular shape with length 66, width 68 and height 70. In select embodiments, the housing may have length 66 of approximately 7.50 inches, width 68 of approximately 3.63 inches, and height 70 of approximately 2.18 inches. Pigtail input connector 42 may be on one side 82 of housing 64 in communication with power input 14, and pigtail output connector 52 may be on the other side 84 of housing 64 in communication with power output 16.

Figure 6:
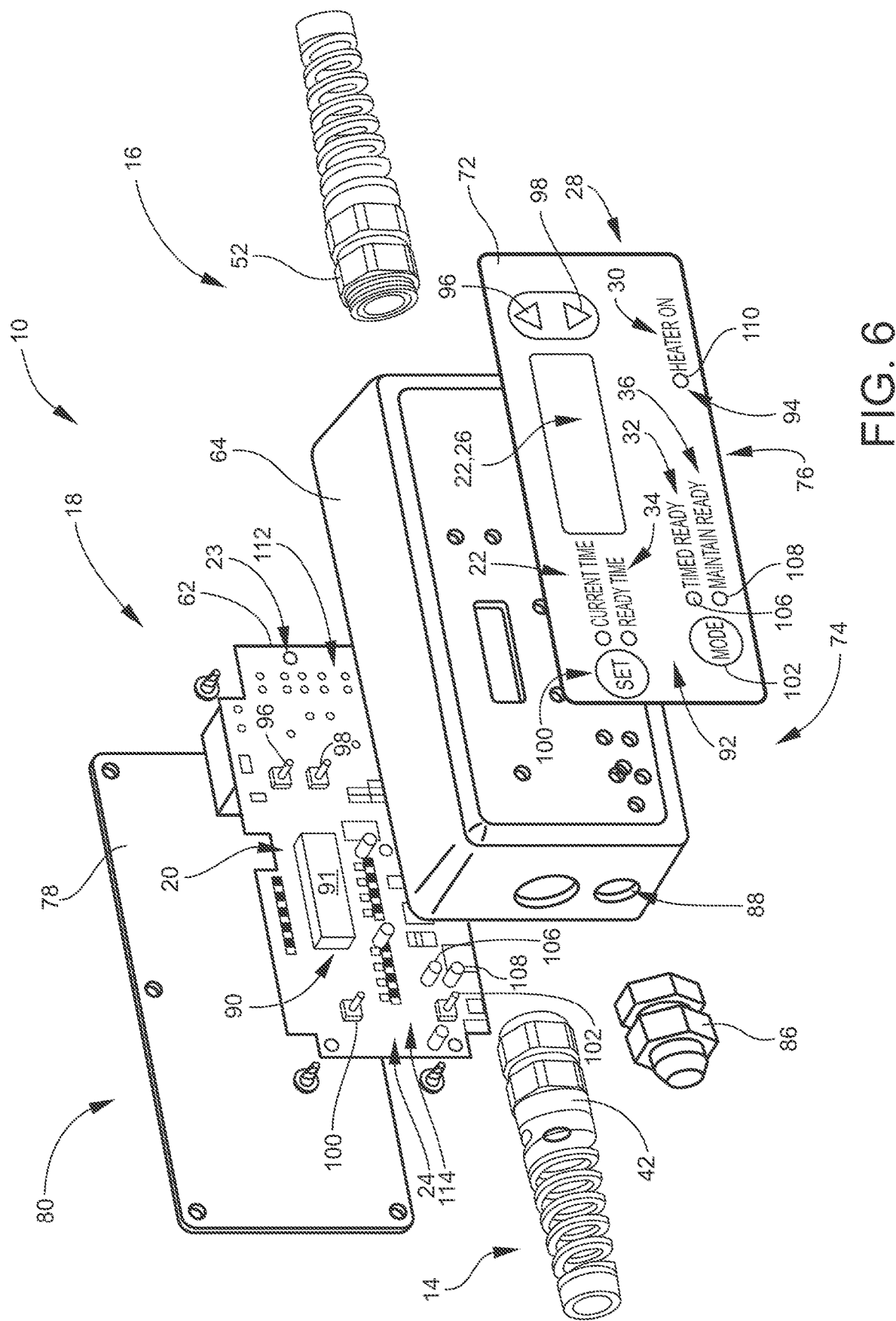
FIG. 6 is a schematic perspective partially disassembled view of the electronic control for engine block heater elements from FIG. 1.

Face plate 72 may be included with controller 18 of electronic control 10 for engine block heater element 12. See FIGS. 1 and 6. Face plate 72 may be on top side 74 of housing 64. Face plate 72 may be for providing user interface 76 for controller 18. User interface 76 may be for providing a means for the user to operate controller 18 of electronic control 10 back and forth between first mode 30, second mode 32, third mode 36, and fourth mode 37. User interface 76 may also be for setting the time 22 on clock 20 and the desired ready time 38. User interface 76 may include display 90 configured to show the time 22 on clock 20, the temperature 26 sensed by temperature sensor 24, the desired ready time 38, or combinations thereof. In select embodiments, the display 90 may be red 7-segmented LED display 91 with 4 digits, similar to a standard clock display. User interface 76 may also include status indicator 92. Status indicator 92 may be configured to signal whether the controller 18 is in the second mode of operation 32 of timed ready, or the third mode of operation 36 of maintain ready. In select embodiments, status indicator 92 may include 2 different LED's 106 and 108 with corresponding text printed on the face plate 72 of "timed ready", and "maintain ready", as shown in FIGS. 1 and 6. User interface 76 may also include power indicator 94. Power indicator 94 may be configured to signal when the power input 14 is connected to the power output 16, like in fourth mode of operation 37, or when the controller 18 is in the first mode of operation 30 of heater off where the power output 16 is disconnected from the power input 14. In select embodiments, power indicator 94 may include an LED 110 with corresponding text printed on the face plate 72 of "heater on", as shown in FIGS. 1 and 6. As such, when LED 110 is lit up, power indicator 94 is signaling that controller 18 is in fourth mode of operation 37, and when LED 110 is not lit up, power indicator 94 is signaling that controller 18 is in third mode of operation 36. Another feature of user interface 76 on face plate 72 may be the inclusion of an up button 96 configured to adjust units of time 22 or set temperature 38 up on the display 90, and a down button 98 configured to adjust units of time 22 or set temperature 38 down on display 90. Another feature of user interface 76 on face plate 72 may be the inclusion of set button 100 configured for setting the adjusted units of the time 22, or the desired ready time 38. Another feature of the user interface 76 on the face plate 72 may be the inclusion of mode button 102 configured for changing the controller 18 back and forth between the first mode of operation 30 of heater off, the second mode of operation 34 of timed ready, the third mode of operation 36 of maintain ready, and the fourth mode of operation 37 of heater on.

Cover 78 may be included with controller 18 of electronic control 10 for engine block heater element 12. See FIGS. 3 and 6. Cover 78 may be on bottom side 80 of housing 64. Cover 78 may be for sealing the printed circuit board 62 in housing 78. Cover 78 may be configured for making the controller 18 water resistant or sealed from non-pressurized moister. Another feature of the enclosure created by housing 64 with cover 78 may be that electronic control 10 may have an operating temperature of between −50° F. and 110° F.

Grommet 86 may be included with controller 18 of electronic control 10 for engine block heater element 12. See FIGS. 1, 3, 5 and 6. Grommet 86 may be in hole 88 on one side 82 of housing 64. Grommet 86 may contain temperature sensor 24 so that it may extend outside housing 64, but be physically protected within the grommet or "cord strainer" for the purpose of accurately measuring outside ambient air temperature.

Battery backup 112 may be included with controller 18 of electronic control 10 for engine block heater element 12. See FIG. 6. Battery backup 112 may be configured to maintain the time 22 kept by the clock 20 for up to 90 days with no power to the power input 14.

Figure 7A:
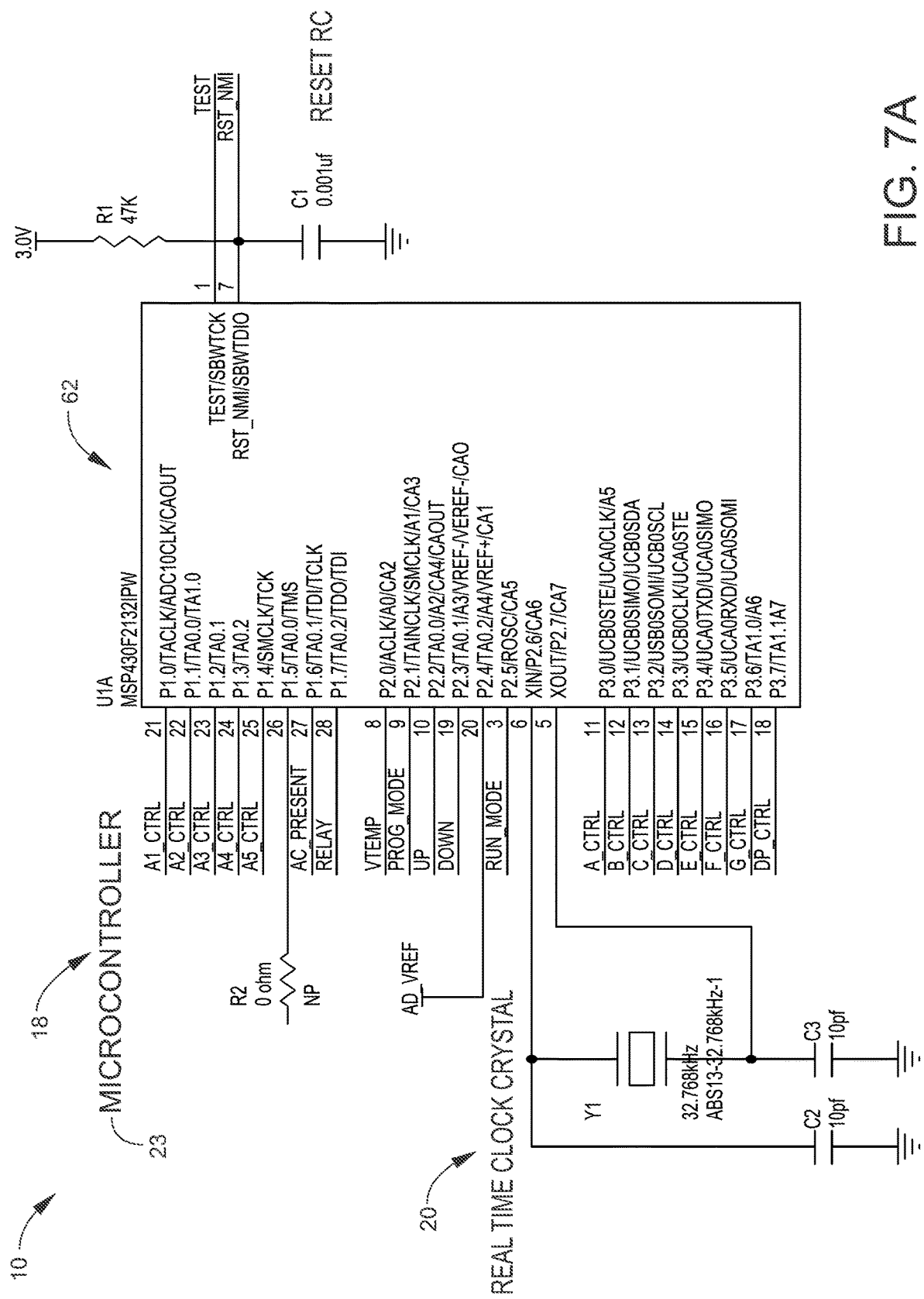
FIGS. 7A-7O are schematic circuit diagrams for the components of the printed circuit board for the electronic control for engine block heater elements according to select embodiments of the instant disclosure, where
Figure 7B:
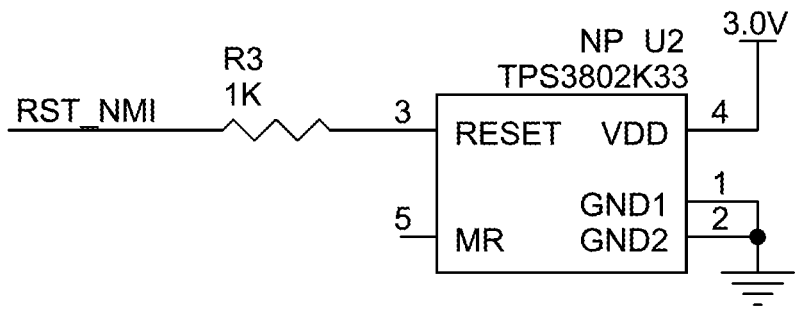
FIG. 7B shows an embodiment of the alternate reset circuit.
Figure 7C:
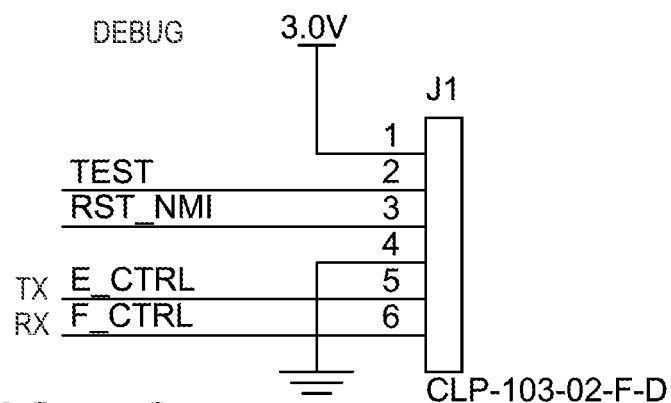
FIG. 7C shows an embodiment of the debug programming connector circuit.
Figure 7D:
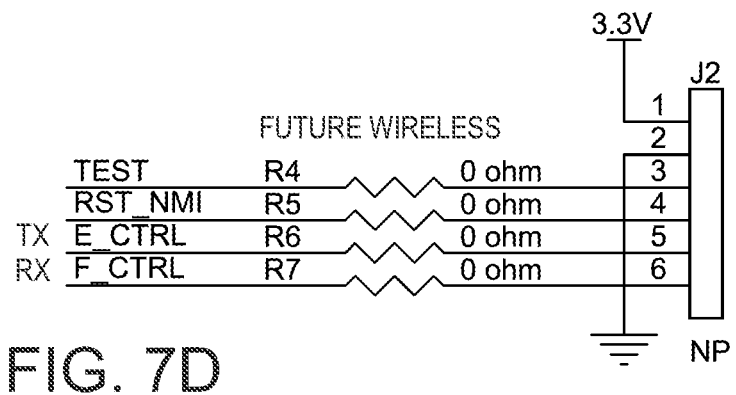
FIG. 7D shows an embodiment of the optional Bluetooth board connector.
Figure 7E:
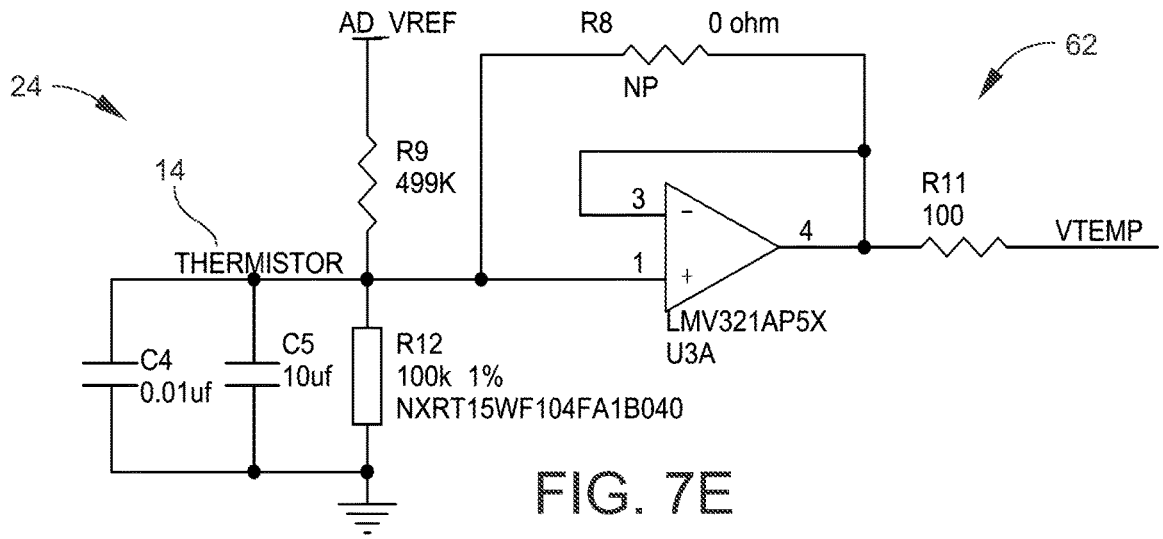
FIG. 7E shows an embodiment of the thermistor temperature measurement circuit.
Figure 7F:
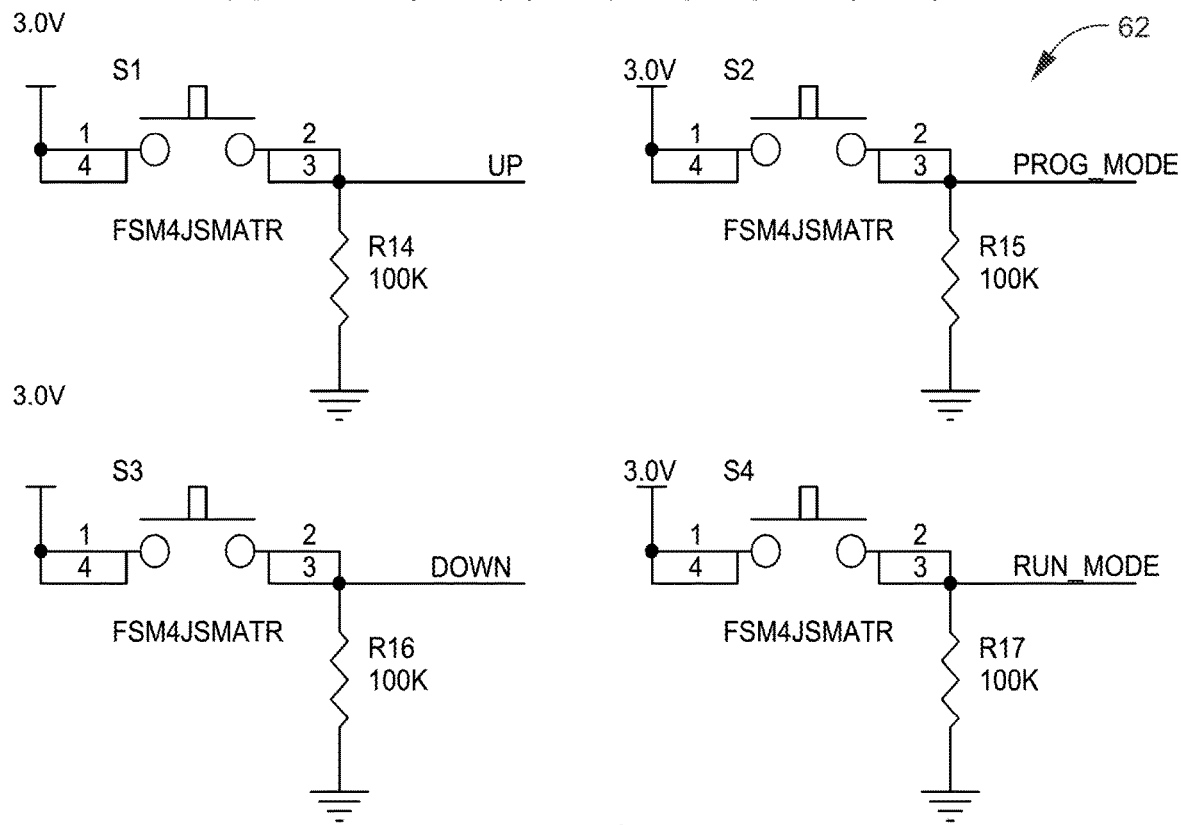
FIG. 7F shows an embodiment of the user input pushbutton switches circuits.
Figure 7J:
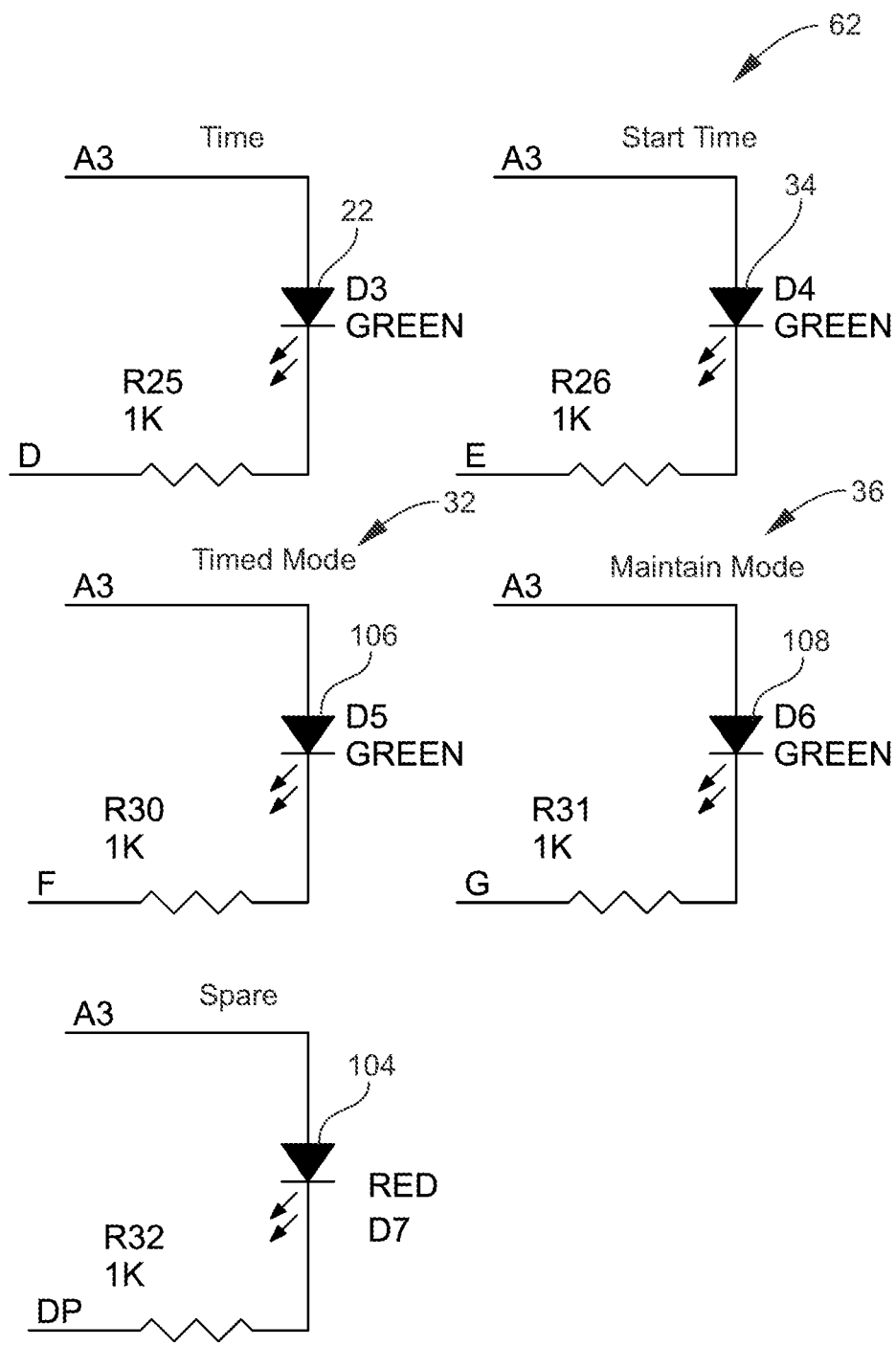
FIG. 7J shows an embodiment of the discrete LED indicators circuits.
Figure 7K:
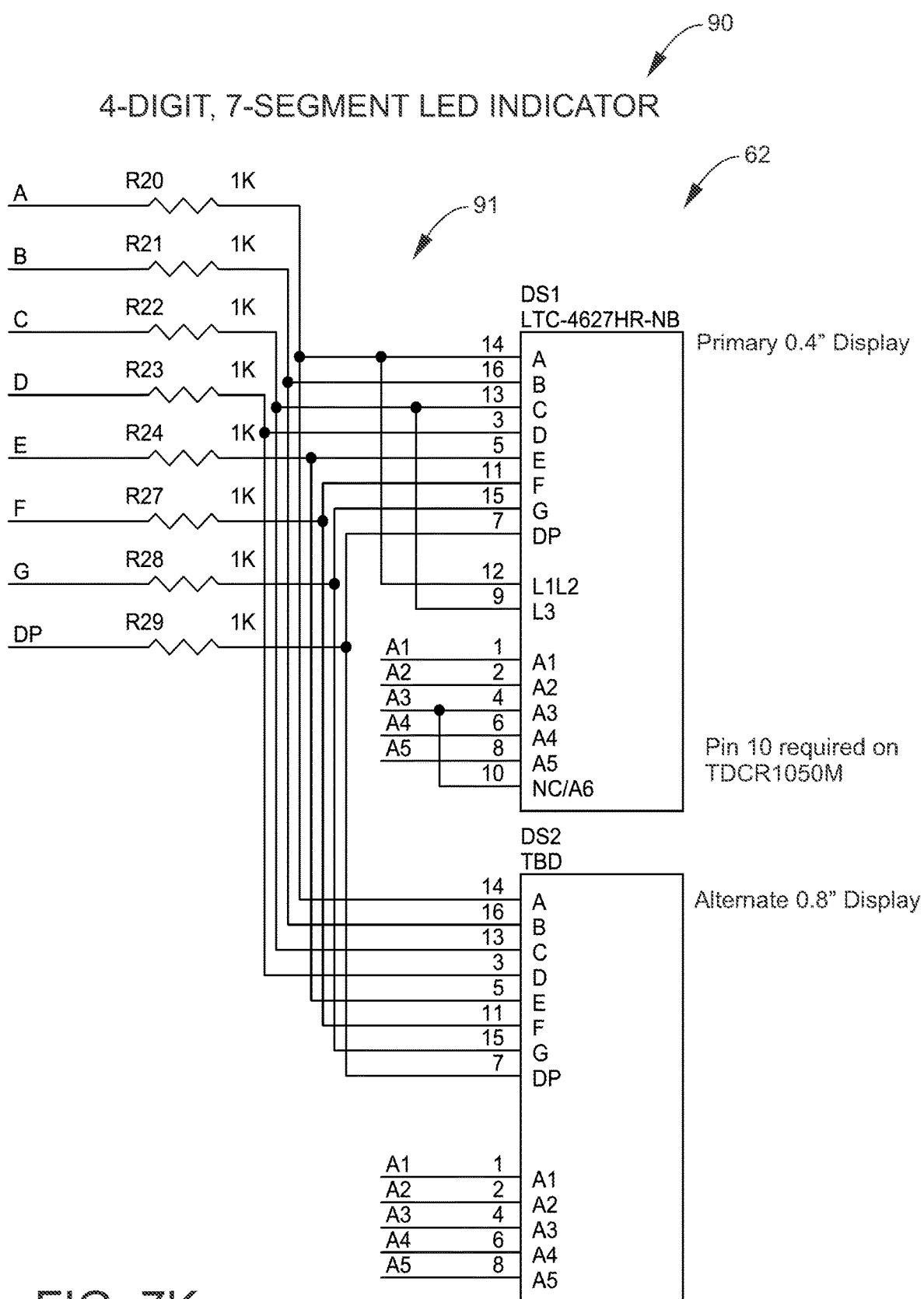
FIG. 7K shows an embodiment of the 4-digit 7-segement LED indicator circuit.
Figure 7L:
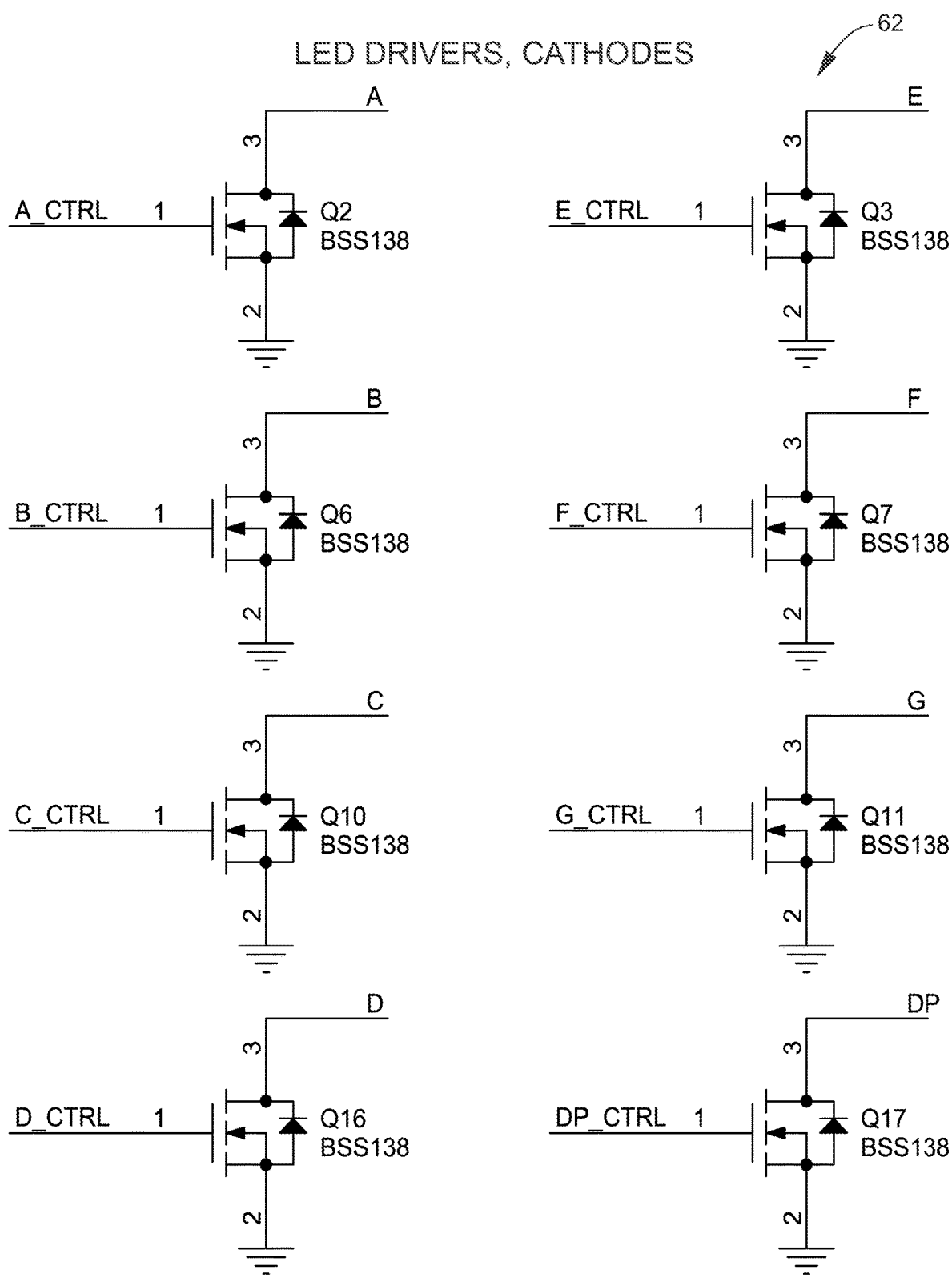
FIG. 7L shows an embodiment of the LED drivers, cathodes circuits.
Figure 7M:
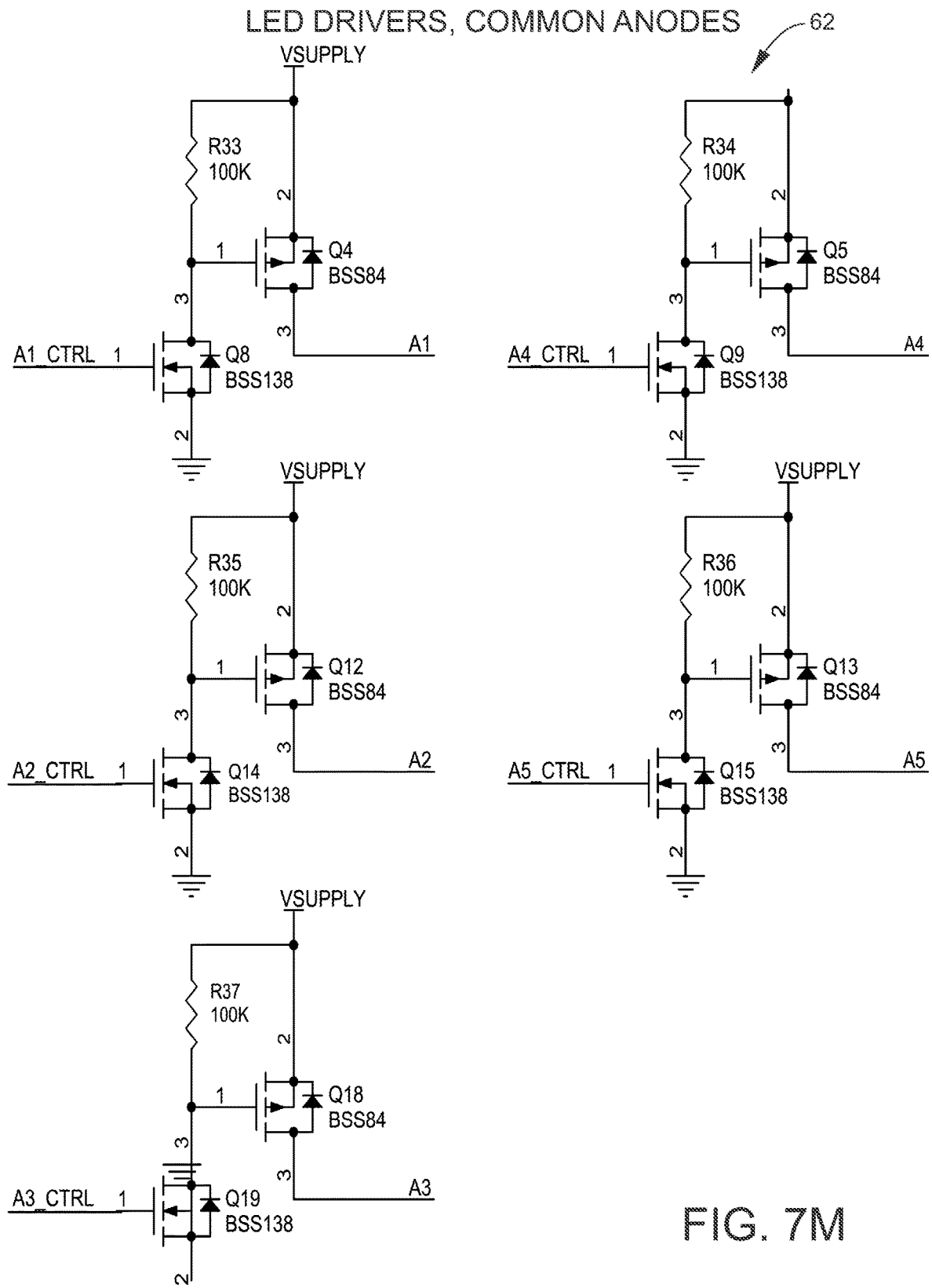
FIG. 7M shows an embodiment of the LED drivers, common anodes circuits.
Figure 7N:
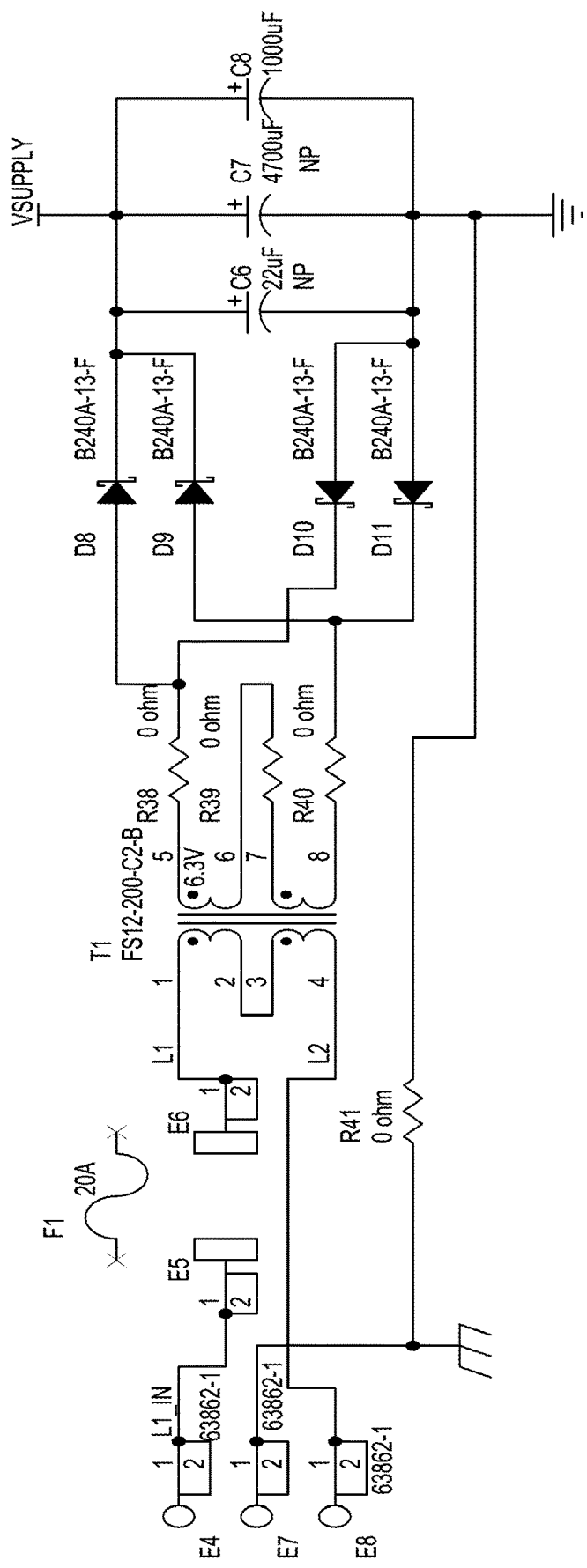
FIG. 7N shows an embodiment of the power supply, 120 VAC/240 VAC to 12 VDC unregulated circuit.
Figure 7O:
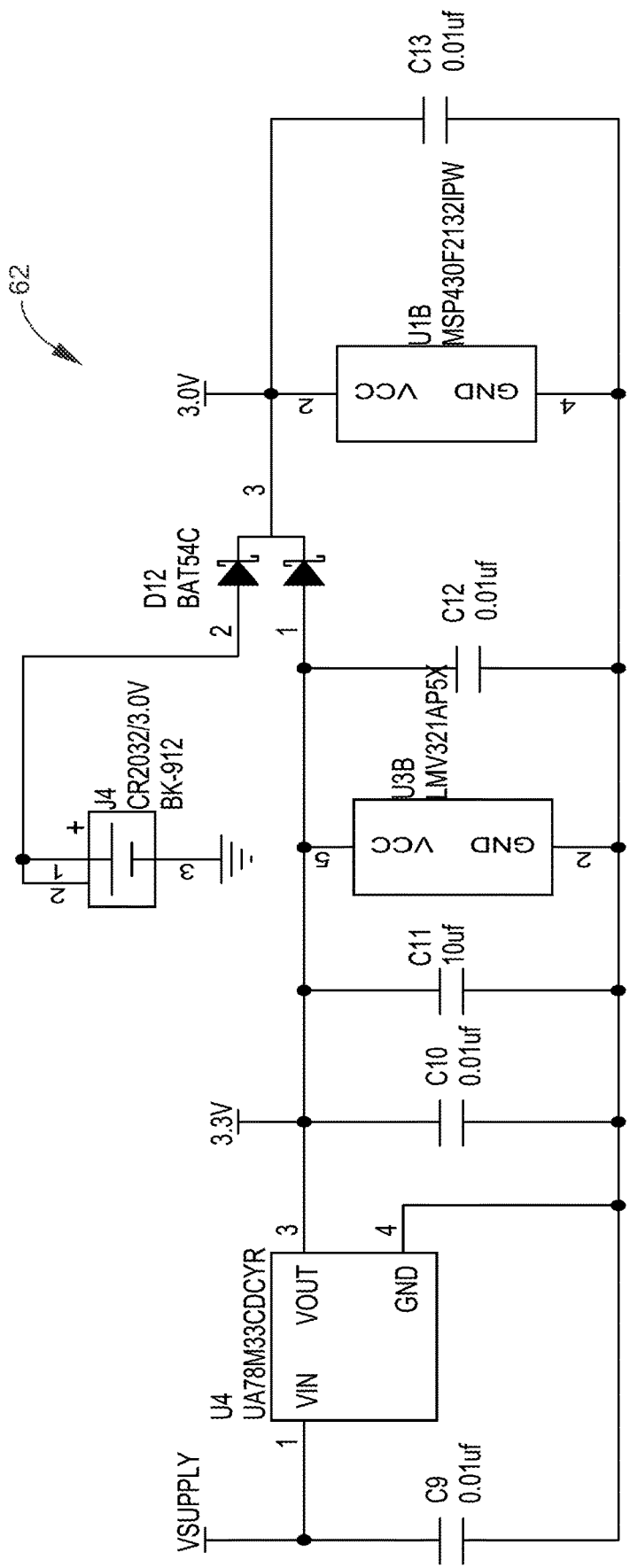

Printed circuit board 62 can be included in controller 18 of electronic control 10 for engine block heater element 12. See FIGS. 6-7. Printed circuit board 62 may be for positioning and connecting all of the various components of controller 18. Printed circuit board 62 may include clock 20, temperature sensor 24, and microprocessor 23, along with any other desired components. As examples, and clearly not limited thereto, FIGS. 7A-7O are schematic circuit diagrams for the components of the printed circuit board 62 for the electronic control 10 for engine block heater element 12 according to select embodiments of the instant disclosure, where FIG. 7A shows an embodiment of the circuit diagram for the microprocessor 23 of controller 18, the real time clock crystal and the reset RC for clock 20, FIG. 7B shows an embodiment of the alternate reset circuit, FIG. 7C shows an embodiment of the debug programming connector circuit, FIG. 7D shows an embodiment of an optional Bluetooth board connector (for controlling the electronic control 10 wirelessly), FIG. 7E shows an embodiment of the thermistor temperature measurement circuit, FIG. 7F shows an embodiment of the user input pushbutton switches circuits of user interface 76, FIG. 7G shows an embodiment of the alternate membrane switch inputs circuit, FIG. 7H shows an embodiment of the AC power sensing circuit, FIG. 7I shows an embodiment of the heater replay output circuit, FIG. 7J shows an embodiment of the discrete LED indicators circuits, FIG. 7K shows an embodiment of the 4-digit 7-segment LED indicator circuit of display 90, FIG. 7L shows an embodiment of the LED drivers, cathodes circuits, FIG. 7M shows an embodiment of the LED drivers, common anodes circuits, FIG. 7N shows an embodiment of the power supply, 120 VAC/240 VAC to 12 VDC unregulated circuit for power input 14 to power output 16, and FIG. 7O shows the power supply, 12 VDC unregulated to 3.3V regulated, for the battery backup circuit of battery backup 112.

Referring now to FIGS. 8-17, with the use of the time 22 kept from clock 20 and the temperature 26 sensed by temperature sensor 24, controller 18 may be configured for controlling the power from the power input 14 to the power output 16 in at least four modes of operation 28: first mode 30 of operation of heater off; second mode 32 of operation of timed ready; third mode 36 of operation of maintain ready; and fourth mode 37 of operation of heater on. These four modes 28 of operation will be discussed in greater detail below.

The first mode 30 of operation of heater off (or idle) may be where the power from the power input 14 to the power output 16 is disconnected. In other words, in this first mode 30 of operation, the controller 18 disconnects, blocks, unplugs, switches off, the like, etc., any power from the power input 14 to the power output 16. As such, no power is provided to the engine block heater element 12 of engine block heater 200.

The second mode 32 of operation of timed ready may be where the power from the power input 14 to the power output 16 may be connected at calculated time interval 24 using the time 22 kept by the clock 20, the desired ready time 38 inputted by the user, and the temperature 26 sensed by the temperature sensor 24. Calculated time interval 34 may be any calculated time or period of time. In other words, in second mode of operation 32, the controller 18 disconnects, blocks, unplugs, switches off, the like, etc. any power from the power input 14 to the power output 16 until the calculated time interval 34, based on a calculation performed by the microprocessor 23 (on the printed circuit board 62) using input data from the time clock 20 and temperature sensor 24. During the calculated time interval 34, in this second mode 32, controller 18 will connect, switch on, plug in, the like, etc. the power from power input 14 to power input 16. As such, only during the calculated time interval 34 will power be provided to the engine block heater element 12 of engine block heater 200. The purpose of this $2^{nd}$ mode 32 of operation of timed ready may be to ready the engine of the subject vehicle for starting at the desired ready time 38 as set by the user. In select embodiments, the second mode of operation 32 of timed ready calculations and corresponding operation of the subject block heater may be based on a combination of time 22 kept by clock 2 and temperature 26 sensed by temperature sensor 24, where the power from the power input 14 to the power output 16 may be connected at the calculated time interval 34 using the time 22 kept by the clock 20 and based on the temperature 26 sensed by the temperature sensor 24 during the calculated time interval 34. In other words, in this embodiment of second mode of operation 32, the controller 18 disconnects, blocks, unplugs, switches off, the like, etc. any power from the power input 14 to the power output 16 until the calculated time interval 34. Once calculated time interval 34 is reached, the controller 18 switches on the power to engine block heater element 12 during calculated time interval 34 so that the engine ready temperature is reached at desired ready time 38.

The third mode 36 of operation of maintain ready may be where the power from the power input 14 to the power output 16 may be regulated to maintain the engine ready temperature (through the use of the block heater) based on the temperature 26 sensed by the temperature sensor 24 and regulations of said controlled block heater's "power on" duty cycle. In select embodiments, in third mode of operation 36, the controller 18 regulates power from the power input 14 to the power output 16 by adjusting duty cycle of heater off and on to the heater element 12 as based on a calculation of the microprocessor, based on temperature 26 as sensed by temperature sensor 24. In other select embodiments, in third mode of operation 36, the controller 18 regulates the power from the power input 14 to the power output 16 by periodically switching on and off the power passed through to power output 16 based on temperature 26 sensed by temperature sensor 24. As such, based on temperature 26 sensed by temperature sensor 24, in third mode of operation 36, controller 18 maintains the desired temperature produced by engine block heater element 12 by adjusting the power level to engine block heater element 12 and/or by periodically switching on/off the power to engine block heater element 12.

The fourth mode 37 of operation of heater on may be where the power from the power input 14 to the power output 16 is connected or passed through without manipulation. In other words, in this fourth mode 37 of operation, the controller 18 connects, unblocks, switches on, the like, etc., any power from the power input 14 to the power output 16. As such, power is provided to the engine block heater element 12 of engine block heater 200.

One feature of the electronic control 10 may be that the power input 14 may be configured to connect to electrical outlet 40, like standard 120V outlet 48, and the power output 16 may be configured to connect to the engine block heater element 12. This feature may allow the first mode of operation 30 of heater off to be where the power from the electrical outlet 40 to the engine block heater element 12 may be disconnected. This feature may also allow the second mode of operation 32 of timed ready to be where the power from the electrical outlet 40 to the engine block heater element 12 may be connected at the calculated time interval 34 using the time 22 kept by the clock 20 and the temperature 26 as measured by the temperature sensor 24 (i.e. thermistor). This feature may also allow the third mode of operation 36 of maintain ready to be where the power from the electrical outlet 40 to the engine block heater element 12 may be regulated to maintain the engine ready temperature based on the temperature 26 sensed by the temperature sensor 24 and calculations of the microprocessor. This feature may also allow the fourth mode of operation 37 of heater on to be where the power from the electrical outlet 40 to the engine block heater element 12 to be connected without manipulation.

Figure 8:
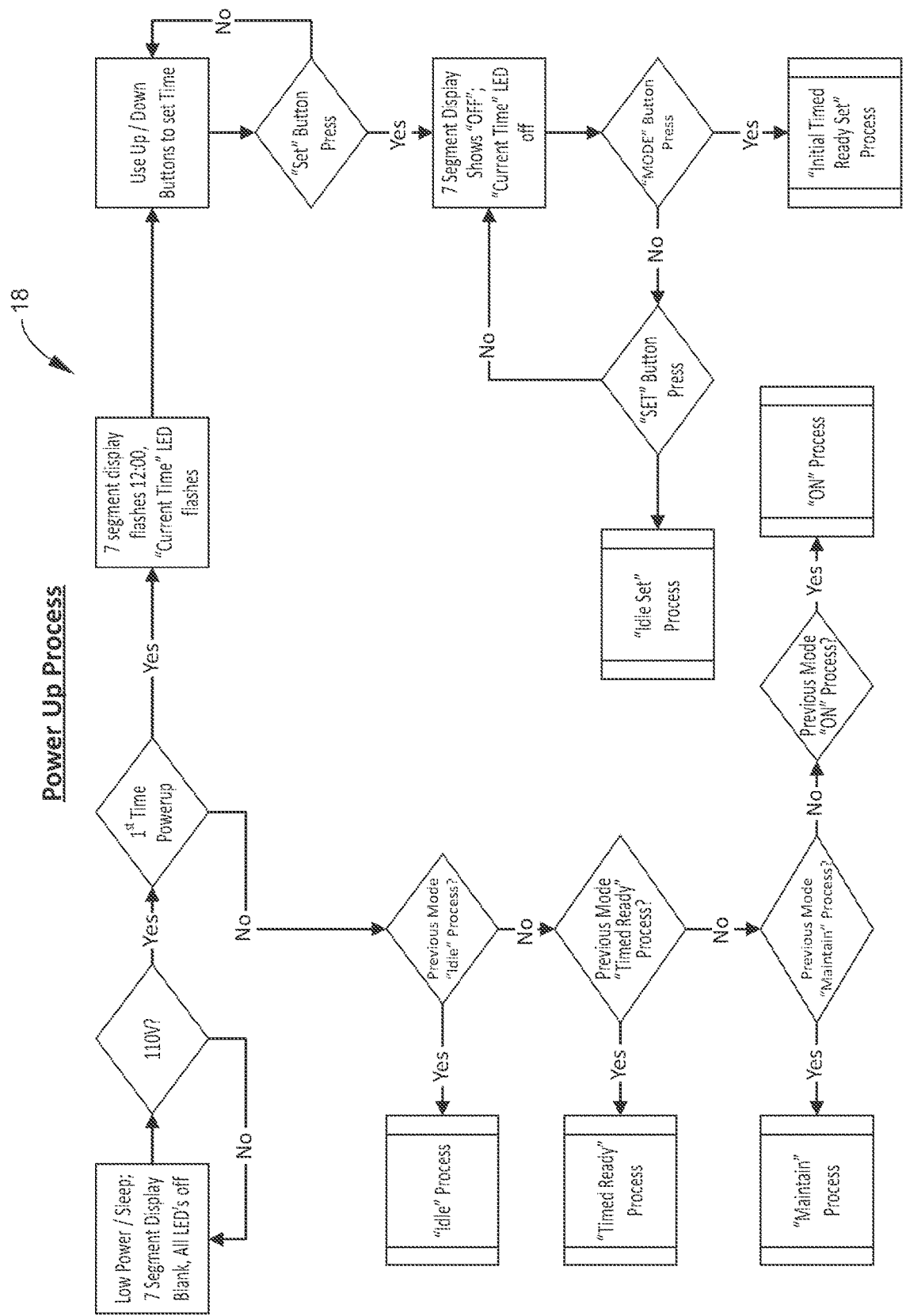
FIG. 8 is a schematic flow diagram of the power up process of the electronic control for engine block heater elements according to select embodiments of the instant disclosure.

Referring now specifically to FIG. 8, a schematic flow diagram of select embodiments of a power up process of the electronic control 10 for engine block heater elements 12 is shown. This diagram illustrates how the controller 18 is operated when first powered on, where if it is the first time powered up the controller 18 first sets the time 22 on clock 20, and then sets the mode of operations 28, between first mode 30 of heater off or idle, second mode 32 of timed ready, third mode 36 of maintain ready, and the fourth mode 37 of heater on. If it is not the first time being powered on, the controller 18 goes back to the previous mode of operations 28: first mode 30 of heater off or idle; second mode 32 of timed ready; third mode 36 of maintain ready; or fourth mode 37 of heater on.

Figure 9:
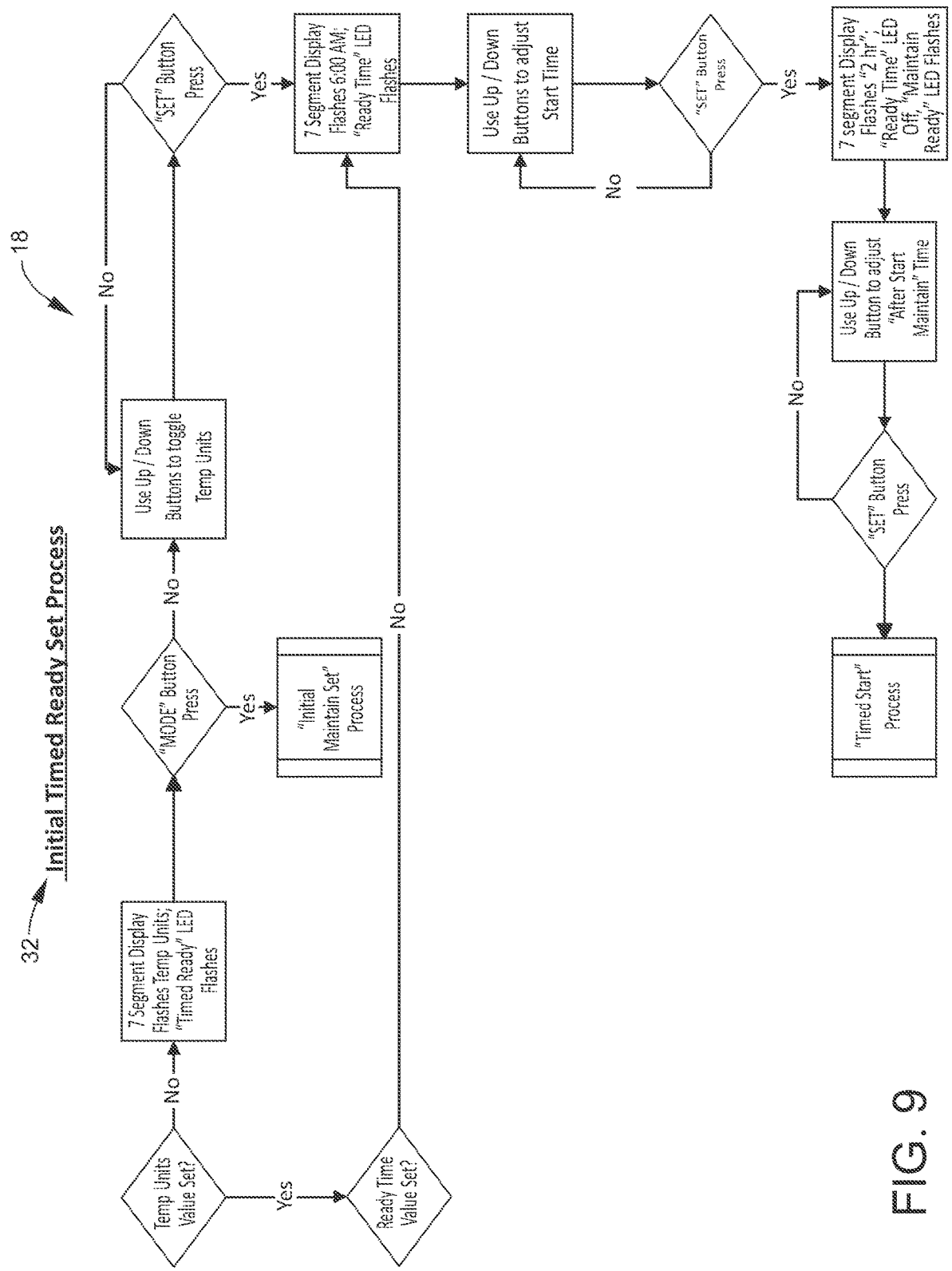
FIG. 9 is a schematic flow diagram of the initial timed ready set process of the electronic control for engine block heater elements according to select embodiments of the instant disclosure.

Referring now specifically to FIG. 9, a schematic flow diagram of select embodiments of an initial timed ready set process of the electronic control 10 for engine block heater elements 12 is shown. As shown, if the desired ready time 38 is not set, the user interface 76 is used on controller 18 for setting desired ready time 38 for clock 20 to operate in second mode of operation 32 of timed ready. If the desired ready time 38 is set, controller 18 operates in second mode of operation 32 of timed ready.

Figure 10:
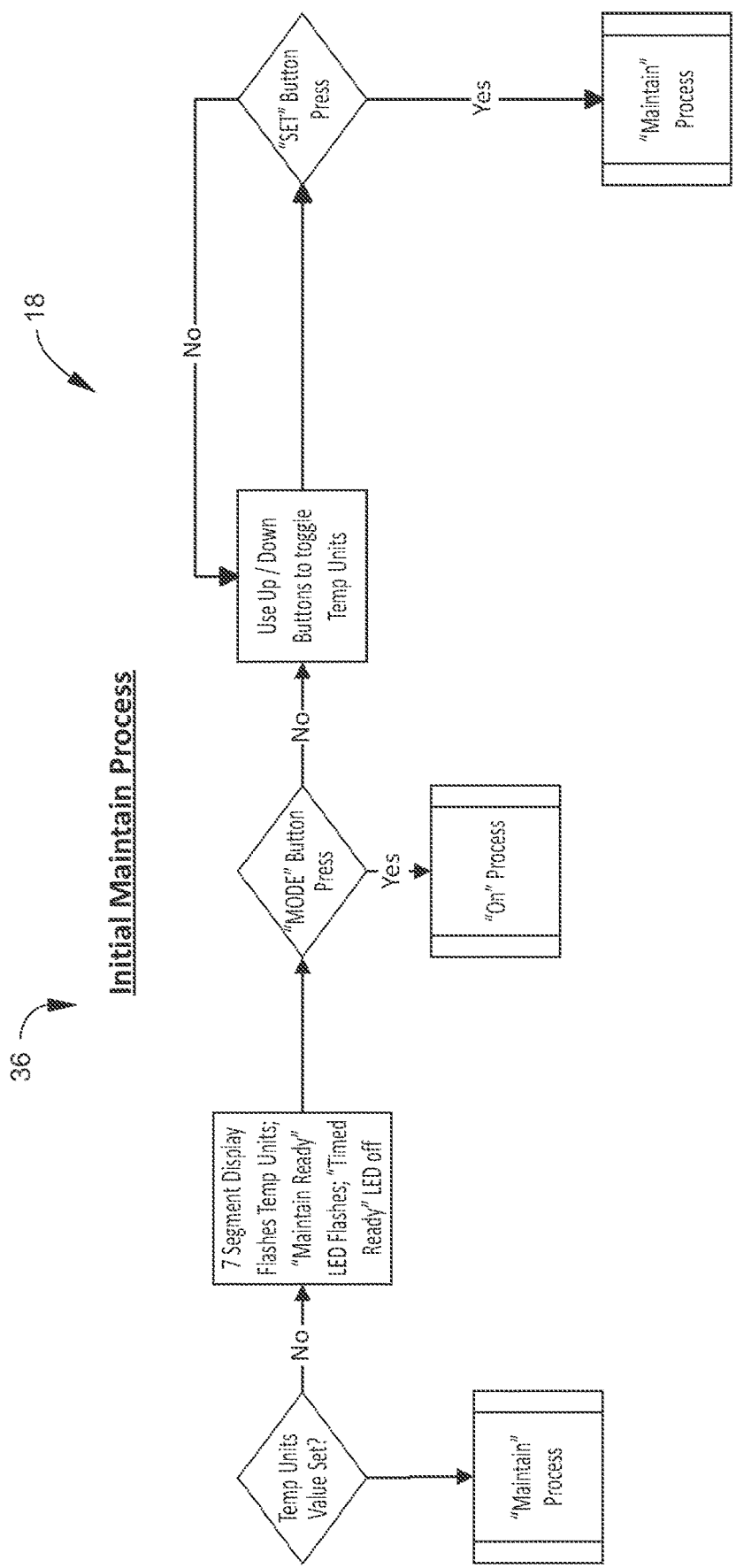
FIG. 10 is a schematic flow diagram of the initial maintain process of the electronic control for engine block heater elements according to select embodiments of the instant disclosure.

Referring now specifically to FIG. 10, a schematic flow diagram of select embodiments of an initial maintain process of the electronic control 10 for engine block heater elements 12 is shown. As depicted, if the temperature units value (° F. or ° C.) is not set, the user interface 76 of controller 18 prompts the user to set the desired temperature units value to operate in third mode of operation 36 of maintain. If the temperature units value is set, controller 18 operates in third mode of operation 36 of maintain ready.

Figure 11:
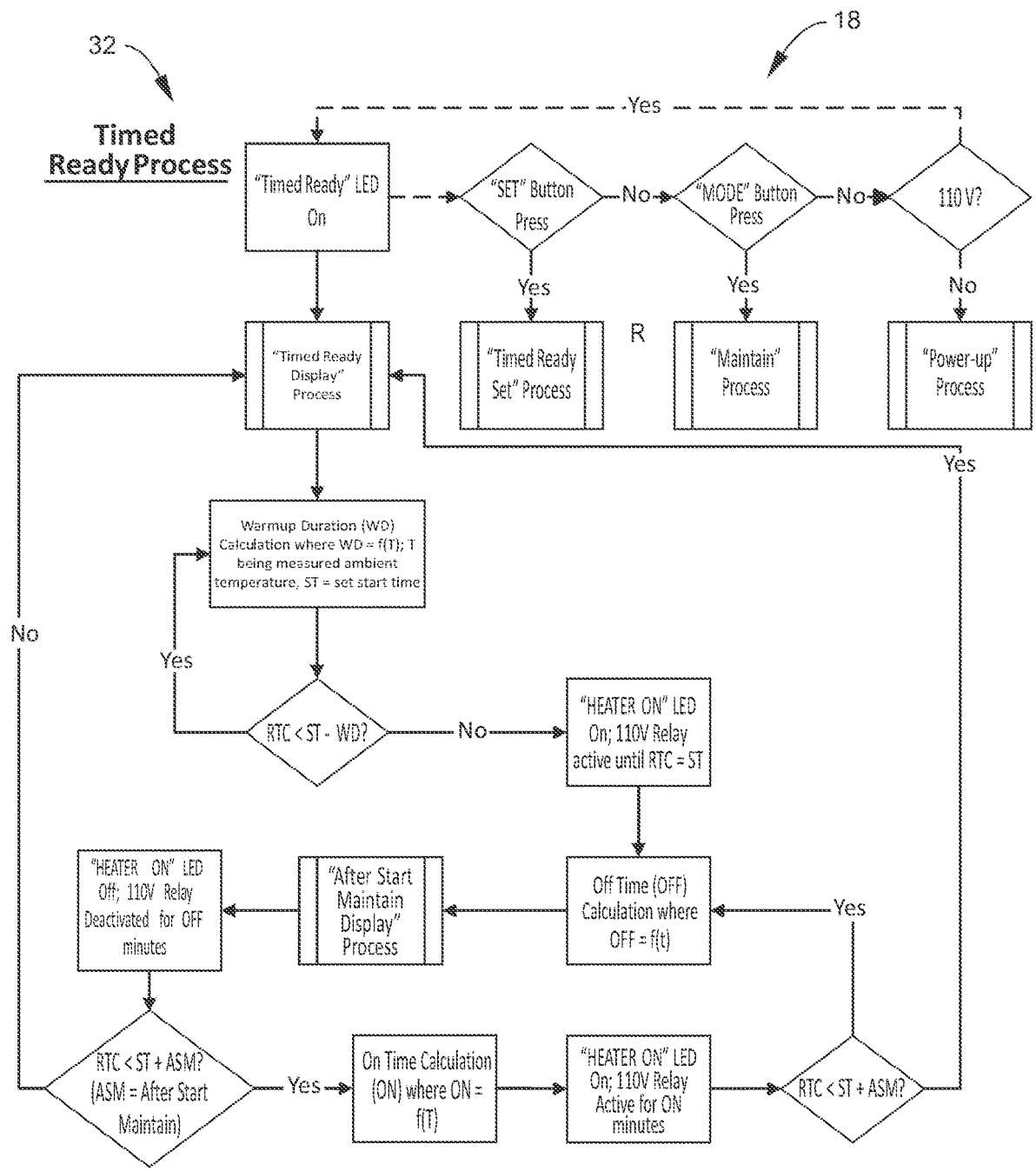
FIG. 11 is a schematic flow diagram of the timed ready process of the electronic control for engine block heater elements according to select embodiments of the instant disclosure.

Referring now specifically to FIG. 11, a schematic flow diagram of select embodiments of a timed ready process of the electronic control 10 for engine block heater element 12 is shown. This timed ready set process of FIG. 12 goes through various possible operations of controller 18 for second mode of operation 32 of timed ready. As shown, if the "timed ready" LED 106 is on, the controller 18 turns the heater on at the calculated time interval 34.

Figure 12:
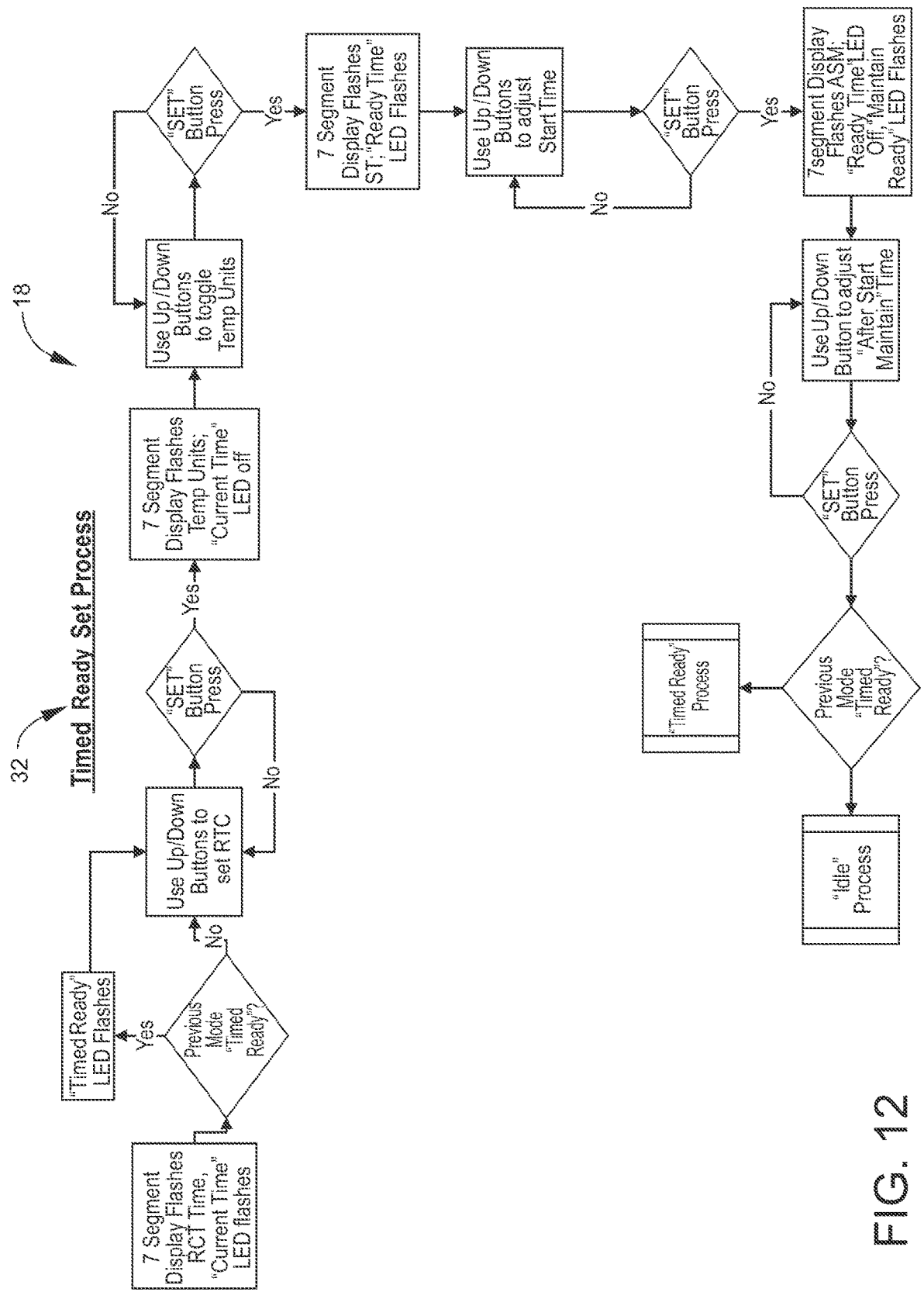
FIG. 12 is a schematic flow diagram of the timed ready set process of the electronic control for engine block heater elements according to select embodiments of the instant disclosure.

Referring now specifically to FIG. 12, a schematic flow diagram of select embodiments of a timed ready set process of the electronic control 10 for engine block heater element 12 is shown. This timed ready set process of FIG. 12 goes through various possible operations of controller 18 for second mode of operation 32 of timed ready.

Figures 13, 14:
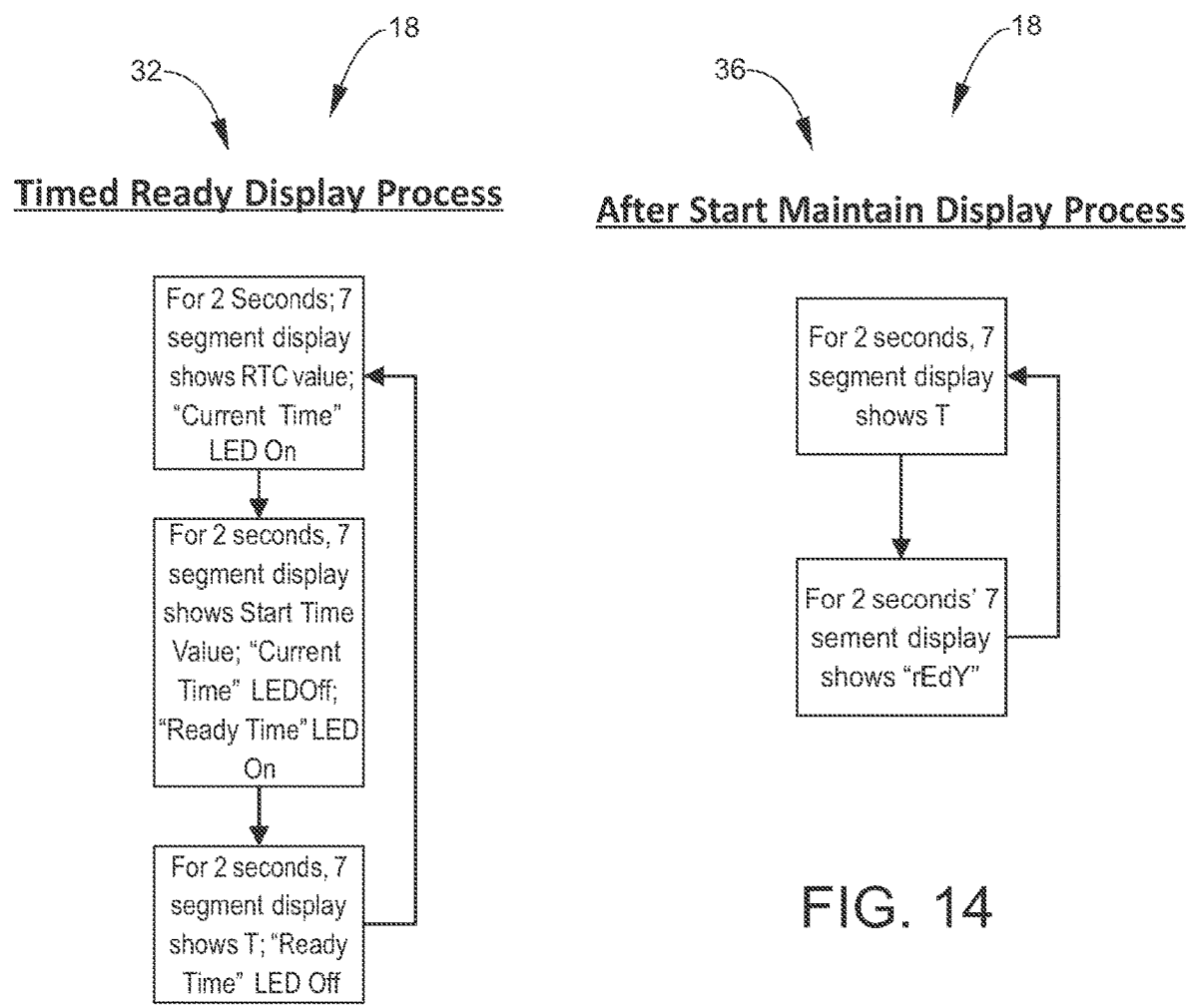
FIG. 13 is a schematic flow diagram of the timed ready display process of the electronic control for engine block heater elements according to select embodiments of the instant disclosure.
FIG. 14 is a schematic flow diagram of the after start maintain display process of the electronic control for engine block heater elements according to select embodiments of the instant disclosure.

Referring now specifically to FIG. 13, a schematic flow diagram of select embodiments of the timed ready display process of the electronic control 10 for engine block heater element 12 is shown. This timed ready display process of FIG. 13 goes through various possible operations of display 90 for second mode of operation 32 of timed ready.

Referring now specifically to FIG. 14, a schematic flow diagram of select embodiments of an after start maintain display process of the electronic control 10 for engine block heater element 12 is shown. This after start maintain display process of FIG. 14 goes through various possible operations of display 90 for third mode of operation 36 of maintain ready.

Figure 15:
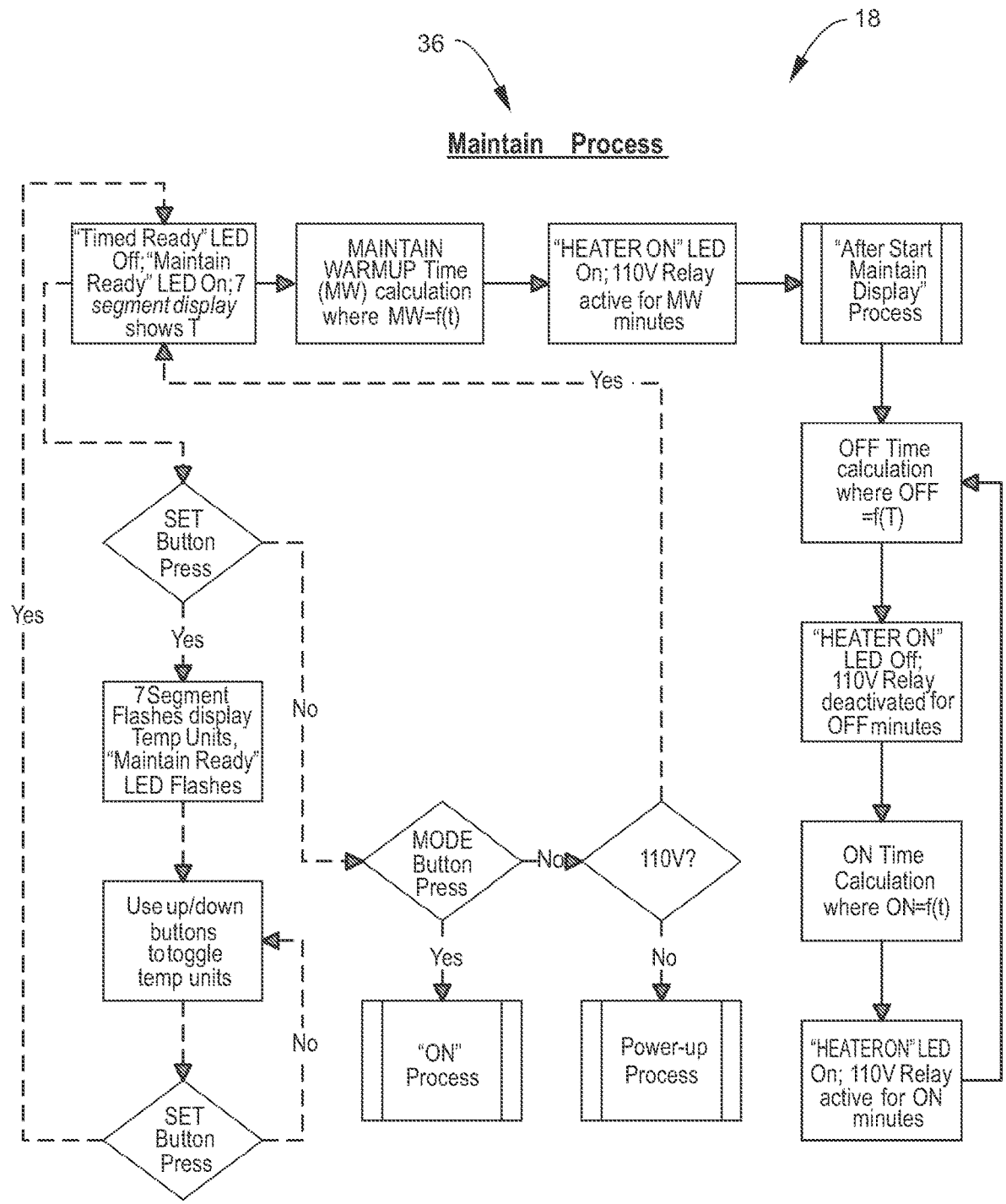
FIG. 15 is a schematic flow diagram of the maintain process of the electronic control for engine block heater elements according to select embodiments of the instant disclosure.

Referring now specifically to FIG. 15, a schematic flow diagram of select embodiments of a maintain process of the electronic control 10 for engine block heater element 12 is shown. This maintain process of FIG. 15 goes through various possible operations of controller 18 for third mode of operation 36 of maintain ready.

Figures 16, 17:
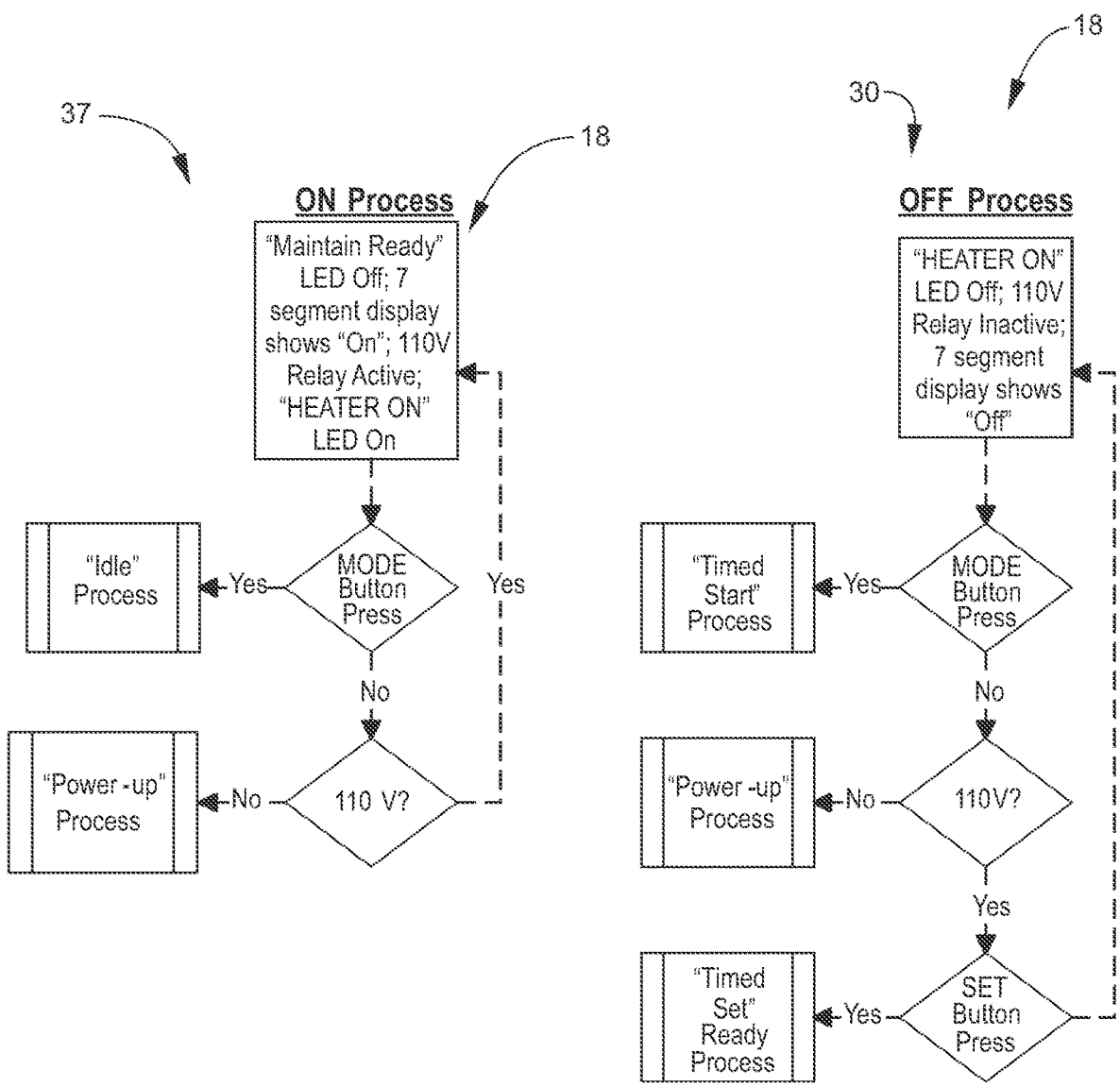
FIG. 16 is a schematic flow diagram of the on process of the electronic control for engine block heater elements according to select embodiments of the instant disclosure.
FIG. 17 is a schematic flow diagram of the off process of the electronic control for engine block heater elements according to select embodiments of the instant disclosure.

Referring now specifically to FIG. 16, a schematic flow diagram of select embodiments of an on process of the electronic control 10 for engine block heater elements 12 is shown. This on process of FIG. 16 goes through various possible operations of controller 18 for fourth mode of operation 37 of heater on.

Referring now specifically to FIG. 17, a schematic flow diagram of select embodiments of an off process of the electronic control 10 for engine block heater element 12 is shown. This off or idle process of FIG. 17 goes through various possible operations of controller 18 for first mode of operation 30 of heater off.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. An electronic control for an engine block heater element for heating an engine to an engine ready temperature comprising:
 a housing for a printed circuit board including:
  a power input;
  a power output; and
  a controller between the power input and the power output, the controller including a clock for keeping a time, a temperature sensor for sensing a temperature, and a microprocessor for making calculations for the controller;
 said controller configured for controlling power from the power input to the power output for heating the engine to the engine ready temperature in at least two modes of operation:
  a second mode of operation of timed ready, wherein the power from the power input to the power output is connected at a time interval calculated by the microprocessor for heating the engine to the engine ready temperature at a desired ready time inputted by a user based on the time kept by the clock and the temperature sensed by the temperature sensor; and
  a third mode of operation of maintain ready, wherein the power from the power input to the power output is regulated by the microprocessor to maintain the engine ready temperature using the temperature sensed by the temperature sensor.

2. The electronic control of claim 1, wherein the controller is configured for controlling power from the power input to the power output for heating the engine to the engine ready temperature in at least two more modes of operation:
 a first mode of operation of heater off, wherein power from the power input to the power output is disconnected; and
 a fourth mode of operation of heater on, wherein power from the power input to the power output is connected without manipulation.

3. The electronic control of claim 2, wherein:
 the power input is configured to connect to an electrical outlet; and
 the power output is configured to connect to the engine block heater element; whereby:
  the first mode of operation of heater off is where the power from the electrical outlet to the engine block heater element is disconnected;
  the second mode of operation of timed ready is where the power from the electrical outlet to the engine block heater element is connected at the calculated time interval for the desired ready time; and
  the third mode of operation of maintain ready is where the power from the electrical outlet to the engine block heater element is regulated to maintain the engine ready temperature based on the temperature sensed by the temperature sensor.

4. The electronic control of claim 3, wherein the power input including a pigtail input connector with a five foot #14-3 conductor power cord, that is good for 1800 watts, with a male end configured to connect to a standard 120V electrical outlet, the pigtail input connector having a length of approximately five feet.

5. The electronic control of claim 3, wherein the power output including a pigtail output connector with a five foot #14-3 conductor output cord, that is good for 1800 watts, with a female end configured to connect to a male end of the engine block heater element, the pigtail output connector having a length of approximately five feet.

6. The electronic control of claim 1, wherein the controller including:
the housing for the printed circuit board having a length of approximately 7.50 inches, a width of approximately 3.63 inches, and a height of approximately 2.18 inches;
a face plate on a top side of the housing for providing a user interface for the controller;
a cover on a bottom side of the housing for sealing the printed circuit board in the housing, thereby making the controller water resistant or sealed from non-pressurized moister; and
a pigtail input connector on one side of the housing in communication with the power input, and a pigtail output connector on the other side of the housing in communication with the power output; and
a grommet in a hole on one side of the housing, the grommet containing the temperature sensor, where the temperature sensor extends outside the housing and is protected within the grommet for measuring outside ambient air temperature.

7. The electronic control of claim 6, wherein the user interface on the face plate including:
a display configured to show the time, the temperature, or combinations thereof;
a status indicator configured to signal whether the device is in the second mode of operation of timed ready, the third mode of operation of maintain ready;
a power indicator configured to signal when the controller is in the fourth mode of operation of heater on where power from the power input is connected to the power output, or the controller is in the first mode of operation of heater off where power from the power output is disconnected from the power input;
an up button configured to adjust units of the time or the temperature up on the display;
a down button configured to adjust units of the time or the temperature down on the display;
a set button configured for setting the adjusted units of the time, the desired ready time, or the temperature units; and
a mode button configured for changing the controller between the first mode of operation of heater off, the second mode of operation of timed ready, the third mode of operation of maintain ready, and the fourth mode of operation of heater on.

8. The electronic control of claim 7, wherein:
the display is a red 7-segmented LED display with 4 digits;
the status indicator includes two different LED's with corresponding text printed on the face plate of "timed ready", and "maintain ready"; and/or
the power indicator includes an LED with corresponding text printed on the face plate of "heater on".

9. The electronic control of claim 1, wherein the controller including a battery backup configured to maintain the time kept by the clock for up to 90 days with no power to the power input.

10. The electronic control of claim 1, wherein the temperature sensor is a thermistor.

11. The electronic control of claim 1 having an operating temperature of between −50° F. and 110° F. and configured to control 2400 w load at 120v AC.

12. An engine block heater for heating an engine to an engine ready temperature comprising:
an electronic control comprising:
a housing for a printed circuit board including:
a power input; and
a power output; and
an engine block heater element connected to the power output;
the electronic control including a controller between the power input and the power output, the controller including a clock for keeping a time, and a temperature sensor for sensing a temperature;
said controller configured for controlling the power from the power input to the power output to heat the engine to the engine ready temperature via the engine block heater element in at least two modes of operation:
a second mode of operation of timed ready, wherein the power from the power input to the power output is connected at a calculated time interval for heating the engine to the engine ready temperature at a desired ready time inputted by a user based on the time kept by the clock and the temperature sensed by the temperature sensor; and
a third mode of operation of maintain ready, wherein the power from the power input to the power output is regulated to maintain the engine ready temperature based on the temperature sensed by the temperature sensor.

13. The engine block heater of claim 12, wherein the controller is configured for controlling the power from the power input to the power output to heat the engine to the engine ready temperature in at least two more modes of operation:
a first mode of operation of heater off, wherein the power from the power input to the power output is disconnected; and
a fourth mode of operation of heater on, wherein the power from the power input to the power output is connected without manipulation.

14. The engine block heater of claim 13, wherein:
the power input is configured to connect to an electrical outlet; and
the power output is configured to connect to the engine block heater element of the engine block heater; whereby:
the first mode of operation of heater off is where the power from the electrical outlet to the engine block heater element is disconnected;
the second mode of operation of timed ready is where the power from the electrical outlet to the engine block heater element is connected at the calculated time interval; and
the third mode of operation of maintain ready is where the power from the electrical outlet to the engine block heater element is regulated to maintain the engine ready temperature based on the temperature sensed by the temperature sensor.

15. The electronic control of claim 12, wherein the controller including:
a printed circuit board including the clock, the temperature sensor, and a microprocessor for making the calculations of the controller;

a housing for the printed circuit board having a length of approximately 7.50 inches, a width of approximately 3.63 inches, and a height of approximately 2.18 inches;

a face plate on a top side of the housing for providing a user interface for the controller;

a cover on a bottom side of the housing for sealing the printed circuit board in the housing, thereby making the controller water resistant or sealed from non-pressurized moister; and a pigtail input connector on one side of the housing in communication with the power input, and a pigtail output connector on the other side of the housing in communication with the power output; and a grommet in a hole on one side of the housing, the grommet containing the temperature sensor, where the temperature sensor extends outside the enclosure but is physically protected within the grommet for measuring outside ambient air temperature.

16. The engine block heater of claim 15, wherein the user interface on the face plate including:

a display configured to show the time, the temperature, or combinations thereof;

a status indicator configured to signal whether the device is in the second mode of operation of timed ready, or the third mode of operation of maintain ready;

a power indicator configured to signal when the controller is in the fourth mode of operation of heater on where the power input is connected to the power output, or the controller is in the first mode of operation of heater off where the power from the power input to the power output is disconnected;

an up button configured to adjust units of time or temperature up on the display;

a down button configured to adjust units of time or temperature down on the display;

a set button configured for setting the adjusted units of the time, the desired ready time, or the temperature units; and a mode button configured for changing the controller between the first mode of operation of heater off, the second mode of operation of timed ready, the third mode of operation of maintain ready, and the fourth mode of operation of heater on.

17. The engine block heater of claim 16, wherein:

the display is a red 7-segmented LED display with 4 digits;

the status indicator includes 2 different LED's with corresponding text printed on the face plate of "timed ready", and "maintain ready"; and/or the power indicator includes an LED with corresponding text printed on the face plate of "heater on".

18. The engine block heater of claim 12, wherein the controller including a battery backup configured to maintain the time kept by the clock for up to 90 days with no power to the power input.

19. The engine block heater of claim 12, wherein the temperature sensor is a thermistor.

20. The engine block heater of claim 12 having an operating temperature of between −50° F. and 110° F. and configured to control 2400 w load at 120v AC.

* * * * *